Feb. 26, 1963  H. WEINRICH  3,078,739
TRANSMISSION
Filed Dec. 19, 1958  12 Sheets-Sheet 1

Inventor
HELLMUT HEINRICH
by Strauch, Nolan + Neale
Attorneys

Feb. 26, 1963 H. WEINRICH 3,078,739
TRANSMISSION
Filed Dec. 19, 1958 12 Sheets-Sheet 2

Inventor
HELLMUT WEINRICH

Strauch, Nolan & Neale
Attorneys

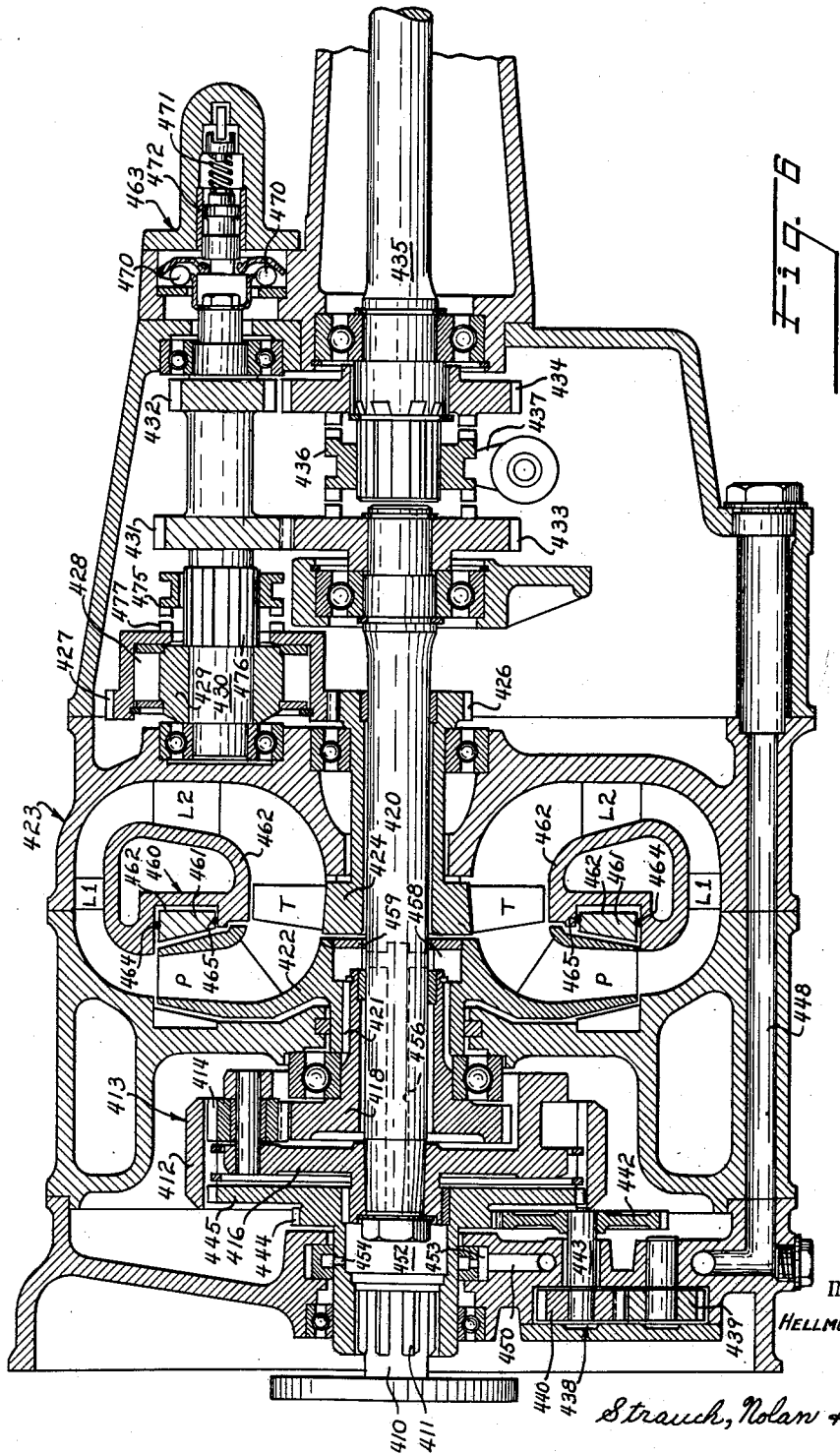

INVENTOR
HELLMUT WEINRICH
BY Strauch, Nolan & Neale
ATTORNEYS

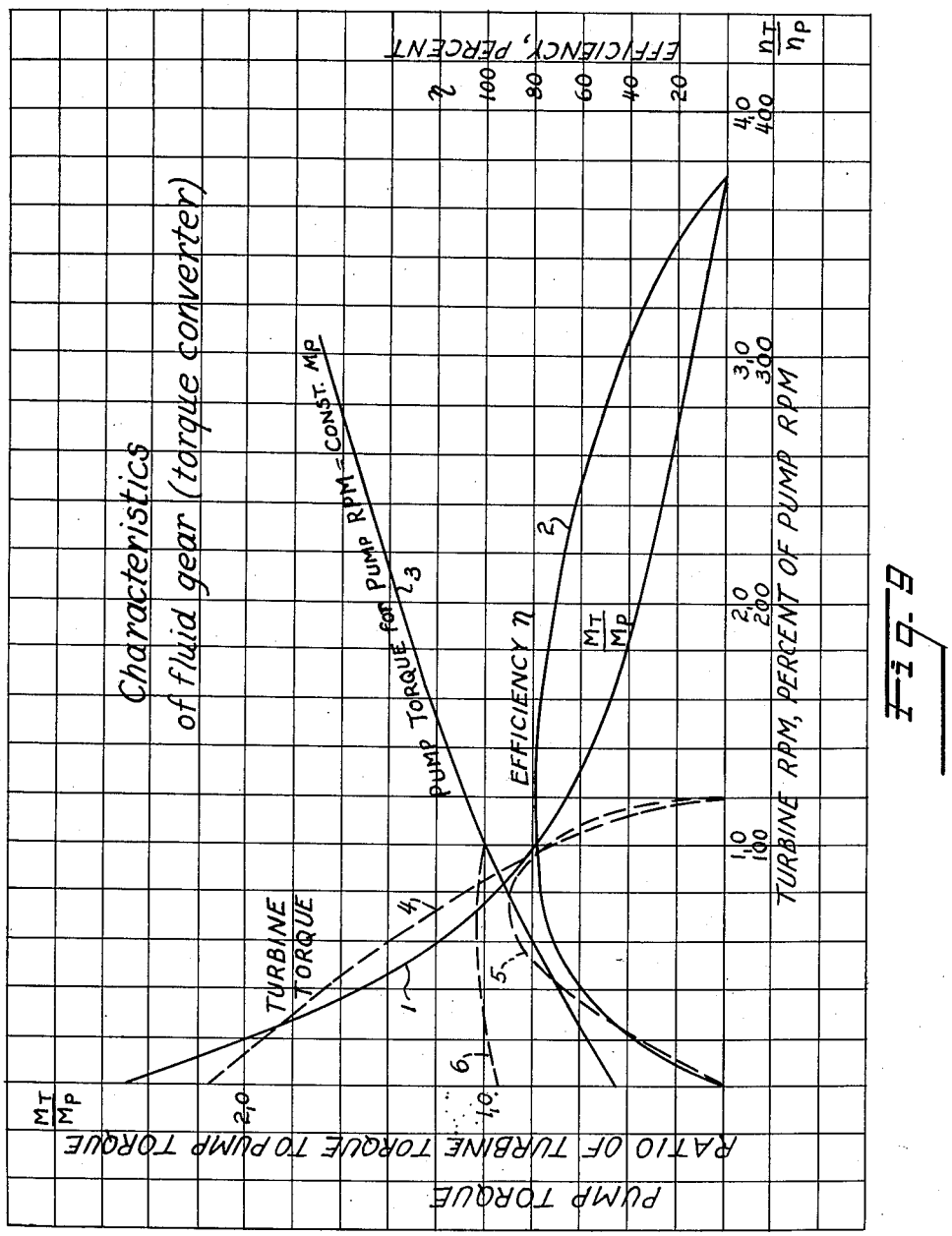

Feb. 26, 1963  H. WEINRICH  3,078,739
TRANSMISSION
Filed Dec. 19, 1958  12 Sheets-Sheet 10
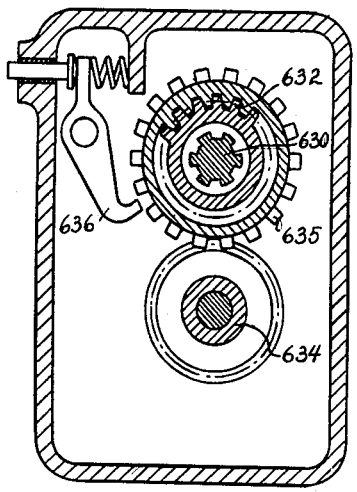
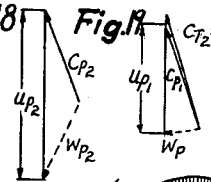
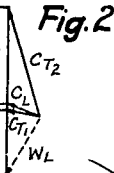
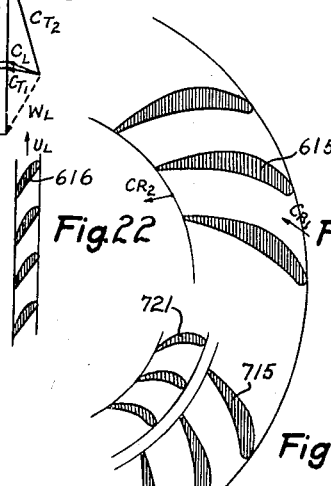
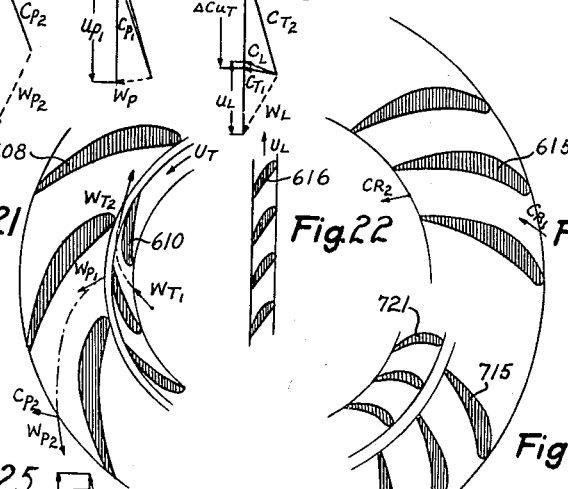
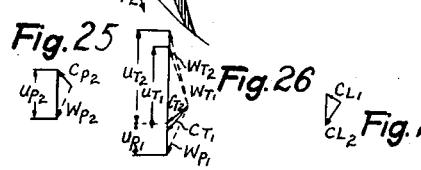
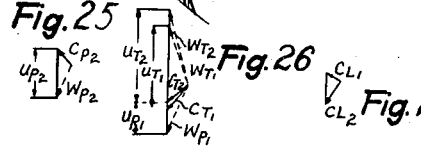
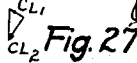
INVENTOR.
HELLMUT WEINRICH
BY
Strauch, Nolan & Neale
ATTORNEYS

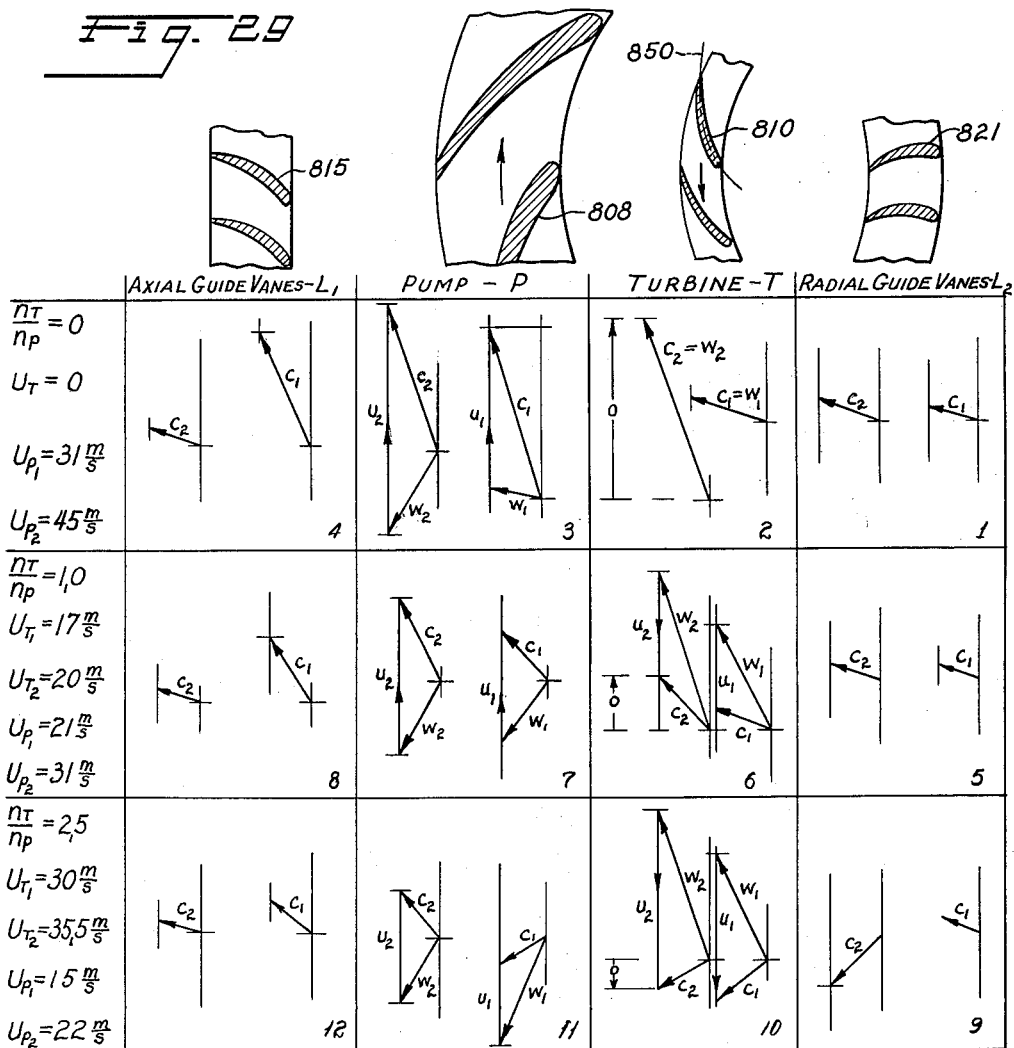
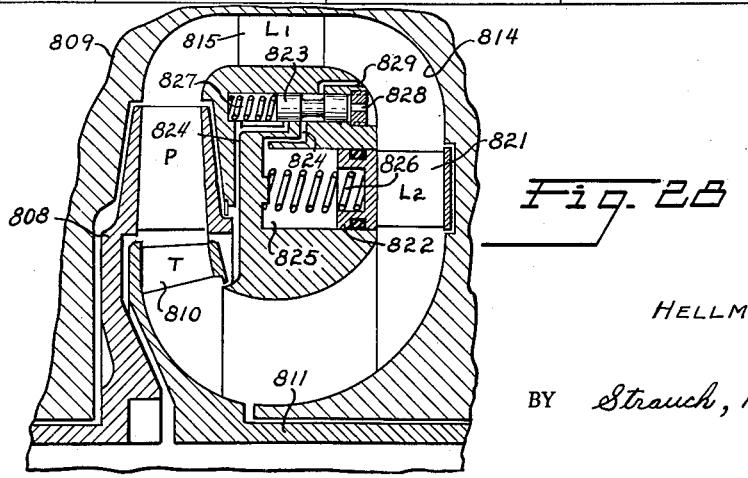

INVENTOR
HELLMUT WEINRICH

{ # United States Patent Office

3,078,739
Patented Feb. 26, 1963

---

3,078,739
TRANSMISSION
Hellmut Weinrich, Pinneburg, near Hamburg, Germany, assignor, by mesne assignments, to Voith-Getriebe, K.G., Heidenheim (Brenz), Germany, a corporation of Germany
Filed Dec. 19, 1958, Ser. No. 781,495
32 Claims. (Cl. 74—720)

This invention relates to infinitely variable and automatically regulating gear mechanisms known as power-shunt transmissions and to torque convertors for such transmissions. As such mechanisms automatically adjust the gear ratio according to the torque or resistance to be overcome, they are particularly suitable for motor vehicles. This function is performed by shiftable toothed gear mechanisms of the prior art only to a limited extent. Moreover the gears of such mechanisms must be shifted to adjust the gear ratios. The fluid drive couplings of the prior art answer the purpose much better, but have not found extensive use on account of their lower efficiency as compared with shiftable toothed gears.

This application is a continuation in part application of Serial No. 249,510 filed October 3, 1951 for Infinitely Variable and Automatically Regulating Gear Mechanisms and Serial No. 497,076 filed March 28, 1955 for Infinitely Variable Automatic Transmission, Especially for Motor Vehicles, both now abandoned.

Transmissions have been proposed which consist of a differential mechanism dividing the power and of a fluid transmission or coupling. With these transmissions when in normal operation, the major part, i.e. between 50% and 75% of the power transmitted by the main shaft is directly led through the differential mechanism to the driven or output shaft, whereas only between 25% and 50% of the power to be transmitted goes through the fluid transmission or coupling. Such infinitely variable and automatically regulating gear mechanisms, however, did not prove satisfactory either, especially for low power.

To achieve a variation in the torque by means of such a fluid transmission the present invention includes the novel concept of providing that the turbine wheel or rotor which is connected to the output or driven shaft revolve in direction opposite to the pump wheel or rotor which is connected to one of the outputs of the differential mechanism. In one preferred form of the invention, the blades of the turbine rotor are disposed in the narrowest flow passage of the fluid transmission or torque converter fluid circuit, the flow passing the turbine blades in an axial direction (that is the turbine is an axial flow turbine) and it is an essential characteristic of the torque converter that the turbine be a reaction turbine, that is the turbine blades are constructed as reaction blades similar to the ones of a Kaplan turbine. As a result of such arrangement, the velocity of rotation of the flow of liquid or air before the pump rotor is to a high degree so influenced by the turbine rotor that, with high speed of the driven shaft, the velocity of rotation approaches zero, and with decreasing speed of the driven shaft, i.e. with decreasing velocity of the vehicle, the velocity of rotation gradually increases.

The fundamental object of this invention is, therefore, to provide a specially designed hydraulic torque convertor which has certain performance characteristics which make it particularly adaptable for use with a power and torque splitting differential gear set and to provide a power-shunt transmission embodying such a torque converter by which the entire unit becomes a highly efficient automotive transmission. The particular construction of the hydraulic torque convertor and the resulting characteristics which make it particularly adaptable to a power-shunt transmission shall be discussed at some length hereinafter.

Other objects of this invention are to provide:
(1) a reaction turbine equipped torque convertor and an improved power-shunt transmission embodying such a torque convertor;
(2) an axial flow reaction turbine equipped torque convertor and an improved power-shunt transmission embodying such a torque convertor;
(3) a radial flow reaction turbine equipped torque convertor and an improved power-shunt transmission embodying such a torque convertor;
(4) a reaction turbine equipped torque convertor embodying a stator at least a portion of which is automatically effectively removed from the torque convertor fluid circuit under certain operating conditions to improve the efficiency of operation under such conditions either
   (a) by retracting such stator portion from its position in the torque convertor fluid circuit to a position remote from such circuit, or
   (b) by permitting such stator position to free wheel in such fluid circuit in response to fluid flow therethrough;
(5) power-shunt transmission embodying a differential input and a reaction turbine equipped torque convertor connected to one of the outputs of the differential wherein means are provided for automatically terminating power consumption by the torque convertor over a predetermined portion of its operating range in which its efficiency is less than a predetermined minimum.

These and other objects and advantages of the invention will appear more clearly from the following specification in connection with the accompanying drawings in which:

FIGURE 6 is a longitudinal sectional view through a power-shunt transmission embodying an axial flow reaction turbine equipped torque convertor and constituting a fourth embodiment of the invention;

FIGURE 9 is a plot of the characteristics of the torque convertor of FIGURE 7;

FIGURE 17 is a cross section taken along the line 17—17 of FIGURE 15;

FIGURES 18 to 20 represent velocity diagrams of the fluid means in the impeller, turbine wheel and reaction member of the convertor of FIGURES 15 and 16 in starting condition and with the turbine at a standstill;

Figure 8:
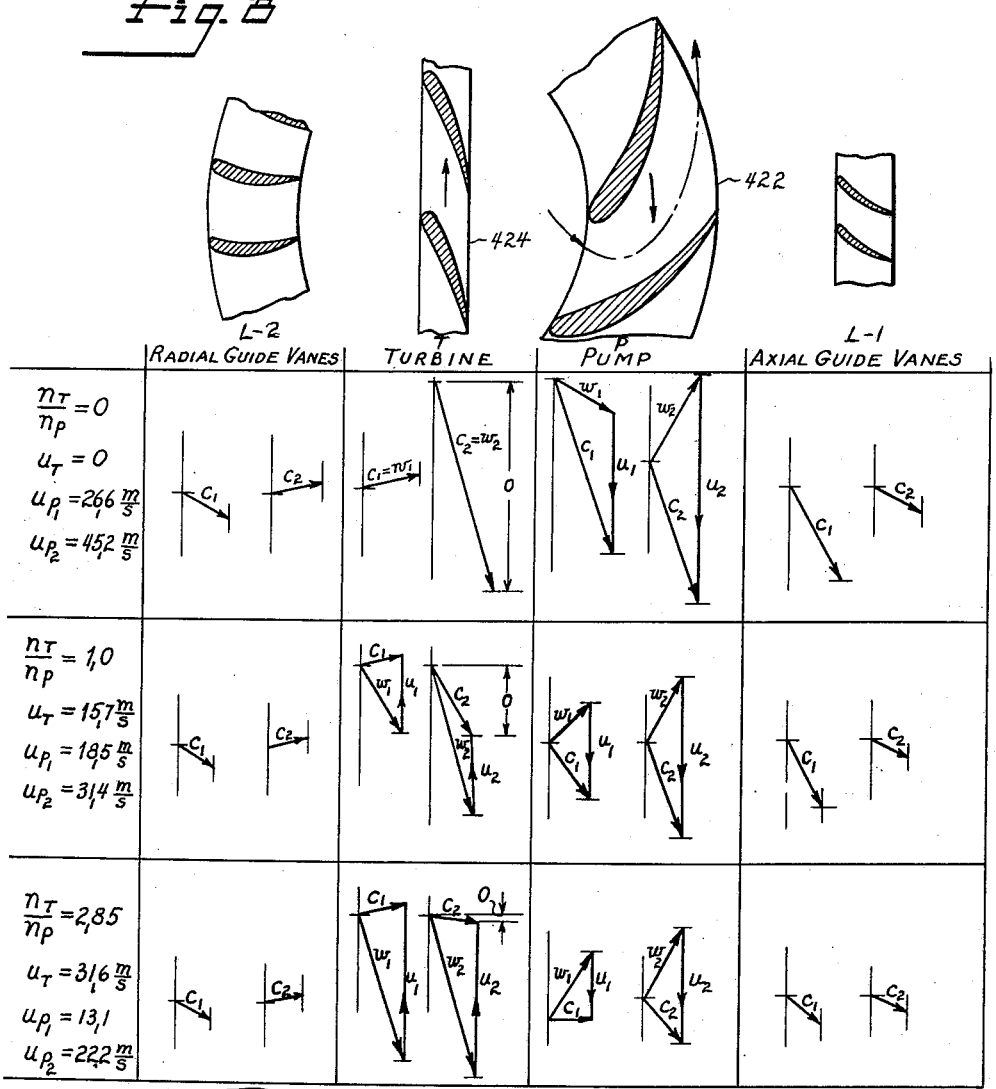
FIGURE 8 is a combined meridan section through the torque convertor circuit of FIGURE 7 and flow velocity diagram for such circuit for three different states of regulation.
Figure 15:
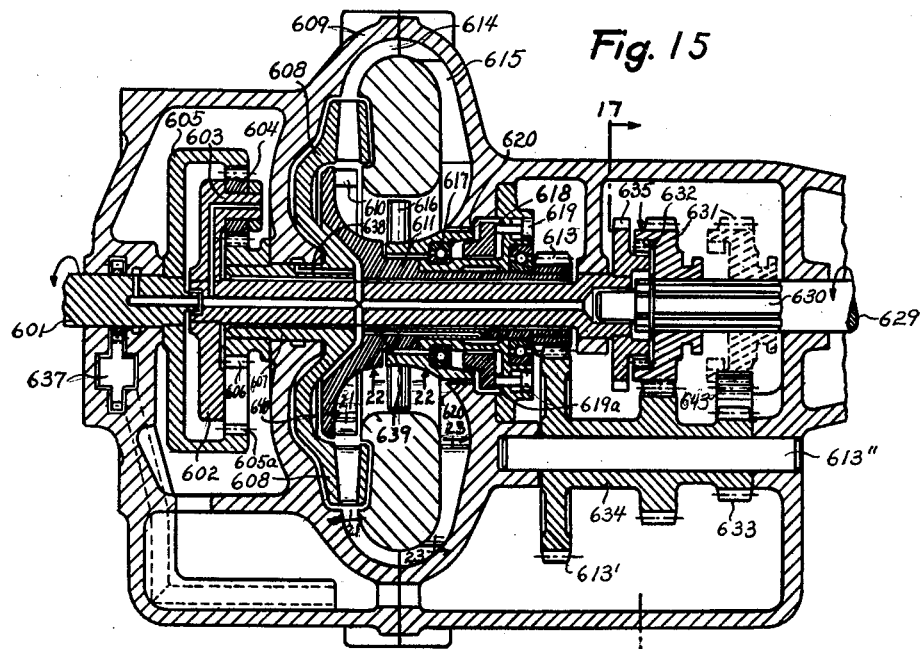
FIGURE 15 is a longitudinal section through a radial turbine type torque convertor equipped power-shunt transmission according to the invention constituting a sixth embodiment of the invention.
Figure 16:
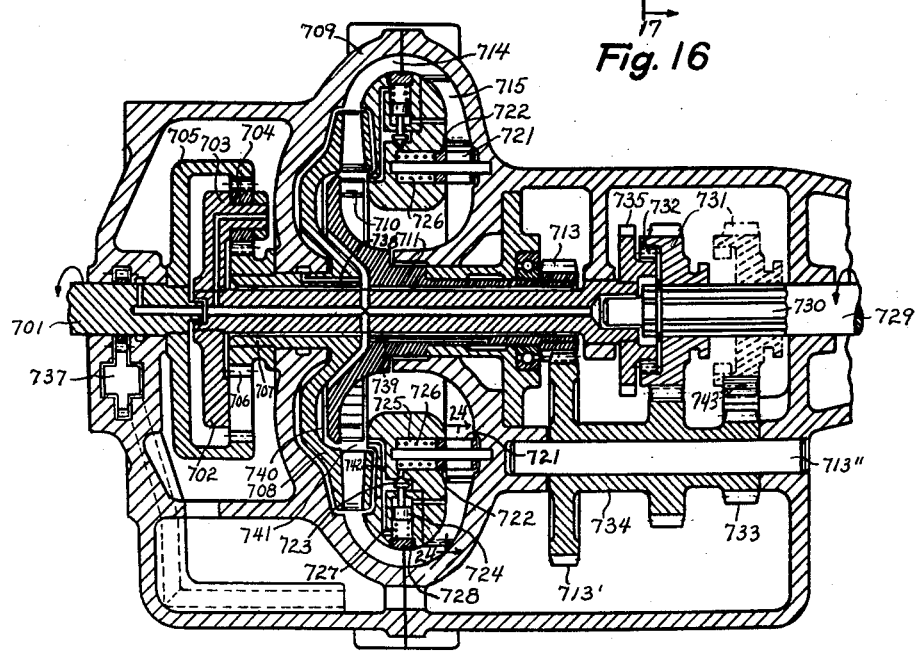
FIGURE 16 is a longitudinal section through a transmission of the invention somewhat modified over the transmission of FIGURE 15 and constituting a seventh embodiment of the invention.
Figure 30:
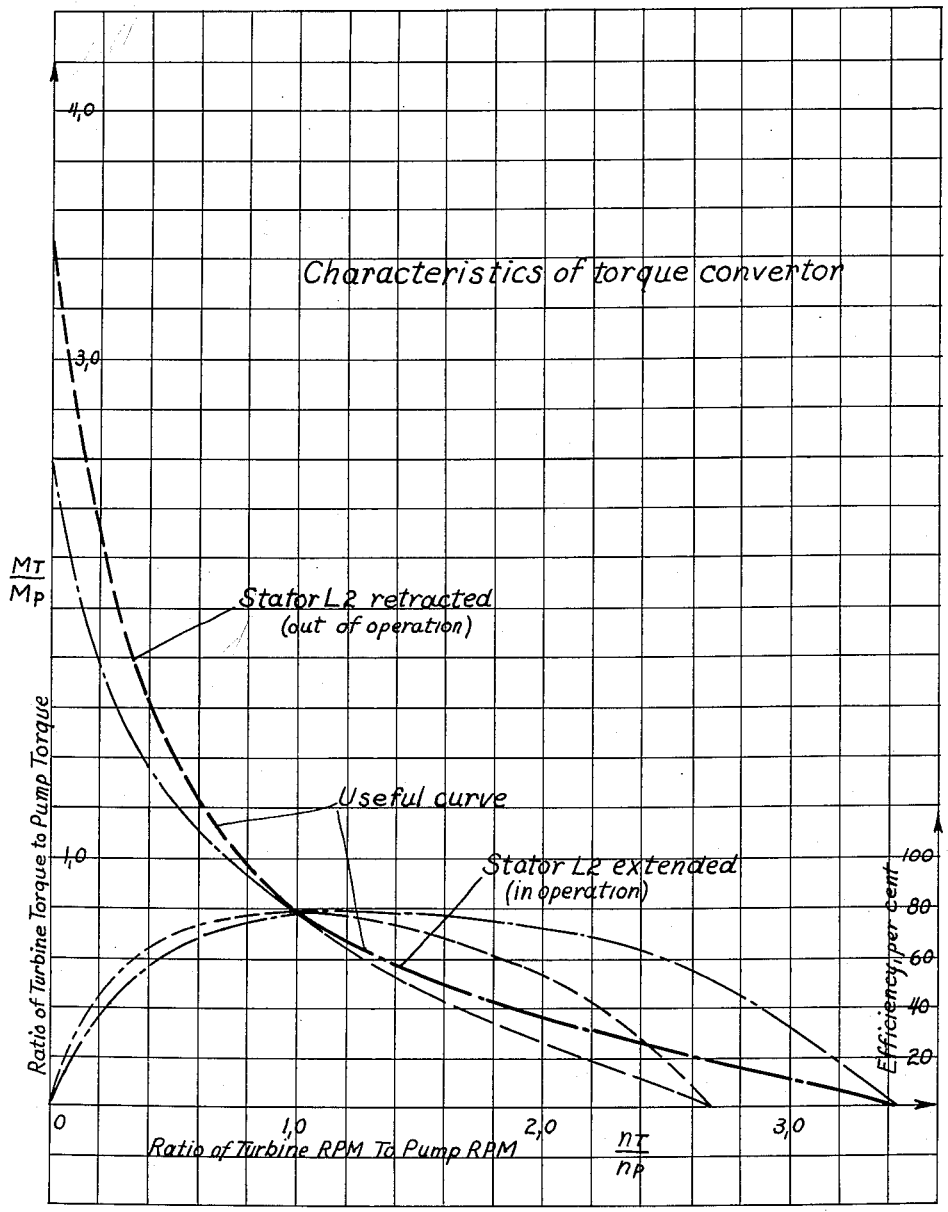

FIGURE 21 diagrammatically shows a section through the impeller and turbine blades, said section being taken along the line 21—21 of FIGURE 15;

FIGURE 22 is a diagrammatic section through an adjustable reaction member, said section being taken around the longitudinal axis of the torque convertor and along the line 22—22 of FIGURE 15;

FIGURE 23 is a diagrammatic section through the blades of the stationary reaction member, said section being taken along the line 23—23 of FIGURE 15;

FIGURE 24 is a diagrammatic section through the blades of the stationary reaction member and of another adjustable reaction member, said section being taken along the line 24—24 of FIGURE 16;

FIGURES 25 to 27 illustrate velocity diagrams of the fluid in the impeller, turbine, and reaction member of the convertor at high speed of the drive shaft;

FIGURE 28 is a diagrammatic illustration of a radial flow turbine equipped torque convertor in accord with the present invention adapted for use in the transmissions of FIGURES 15 or 16 and constituting an eighth embodiment of the invention;

FIGURE 29 is a combined meridian section and velocity diagram for the torque convertor of FIGURE 28 and similar to FIGURE 8; and FIGURE 30 is a plot of the characteristics of the torque convertor of FIGURE 28.

Returning now to the drawings in detail, this description will proceed first with a description and analysis of the operation of the several disclosed embodiments embodying an axial flow reaction turbine equipped torque convertor and then into a description and analysis of the operation of the several disclosed embodiments embodying a radial flow reaction turbine equipped torque convertor.

*First Embodiment (FIGURES 1–3)*

Figure 1:
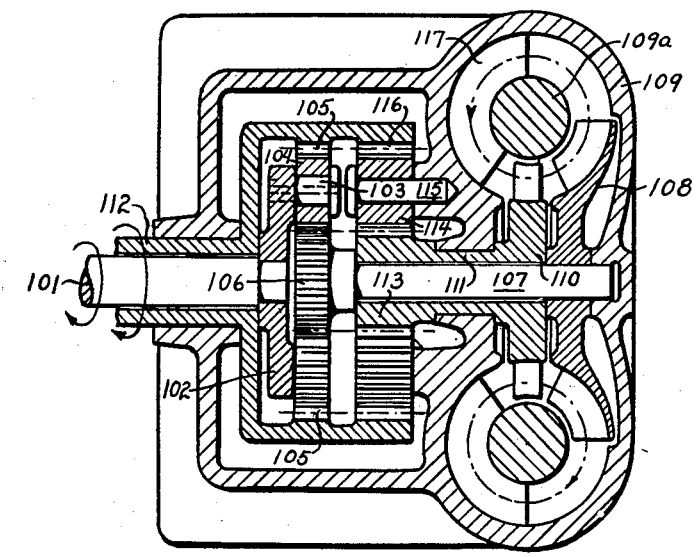
FIGURE 1 is a section view of a power-shunt transmission constituting one form of the invention and embodying an axial flow turbine equipped torque convertor in accord with the present invention.
Figure 2:
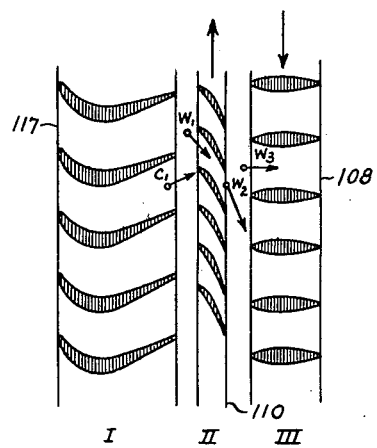
FIGURE 2 is the development of the meridian section through the pump, turbine and stator blades of the torque convertor flow circle or circuit according to FIGURE 1.

The input differential gear mechanism of the power-shunt transmission shown in FIGURE 1 is constructed as a planetary gear mechanism. The power coming from the engine (not shown) is transmitted to the planet carrier 102 through the input or main drive shaft 101 to which it is fixed. To the planet carrier 102 are attached a plurality of equiangularly spaced bolts or stub shafts 103 on which the planetary pinions 104 are rotatably mounted. These planetary pinions 104 are in constant meshing engagement with the internal teeth of the ring gear 105 and with the external teeth of a sun gear 106. Through a pump shaft 107, the sun gear 106 is rigidly connected to a radial flow centrifugal pump rotor 108 which is rotatably mounted in the housing 109 of the torque convertor. An axial flow reaction turbine rotor 110 is rotatably disposed in said housing in concentric surrounding relation to shaft 107. The blades or turbine rotor 110 are constructed as reaction blades having in profile the form of wings or air foils as is illustrated in FIGURE 2 and similar to those of a Kaplan turbine. In the preferred forms of the invention, the transmission fluid passes through the blades of turbine rotor 110 in an axial direction, that is, parallel to the common axis of rotation of the rotors 108 and 110. Turbine rotor 110 is connected to the sun gear 113 of an output planetary gear mechanism through a hollow shaft 111. Sun gear 113 is in constant mesh with a plurality of equiangularly spaced planetary pinions 114 rotatably mounted on rigidly fixed bolts 115 or stub shafts which are fixed upon housing 109. Planetary pinions 114 are in constant mesh with the teeth of an internal ring gear 116 rigidly connected to the driven or output shaft 112 and ring gear 105. Owing to this second planetary gear mechanism, the turbine rotor 110 may be made capable of rotating at a higher rate than the driven shaft 112. Thereby it is possible, contrary to constructions hitherto in use, to dispose the blades of turbine 110 in the narrowest passage of the flow circle between the reaction member or stator 117, which in this embodiment is a rigidly fixed unitary structure, and the pump wheel 108 and to have them streamed through there. That is, the blades of turbine 110 are located in the portion of the fluid circuit which is of minimum cross-section. Owing to such arrangement the range of regulation in which the efficiency of a hydraulic power-shunt transmission is relatively high can be increased considerably. This takes effect particularly in that limit case where the driven shaft comes to a stop and the motor runs with open throttle.

Whereas in a transmission mechanism with pump and turbine wheels running in the same direction the turning momentum of the driven shaft at the start is at most twice as great as the torque at full speed, an arrangement according to FIGURE 1 in which the turbine is a reaction turbine and rotates in a direction opposite the direction of drive of the pump will ensure that the turning momentum of the driven shaft 112 at the starting condition is from three to five times greater than the torque at full speed.

FIGURE 2 shows a development of the meridian section through the blades of the flow circle or fluid circuit of the torque convertor according to FIGURE 1. In that figure, I indicates the blades of the guide wheel or reactor member 117, II indicates the blades of the turbine rotor 110 and III indicates the blades of the pump or impeller 108.

Figure 3:
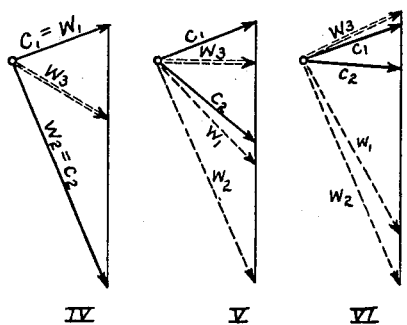
FIGURE 3 shows the diagrams of the velocity of fluid flow in the torque convertor circuit of FIGURES 1 and 2 in three different states of regulation.

In FIGURE 3 there is indicated the velocity of the flow of the liquid in three different states of regulation.

$c_1$=absolute velocity of the fluid on leaving the guide wheel 117, $c_2$=absolute velocity of the fluid on leaving the turbine rotor 110, $w_1$=relative velocity of the fluid on entering the turbine rotor 110, $w_2$=relative velocity of the fluid on leaving the turbine rotor 110, $w_3$=relative velocity of the fluid on entering the pump.

IV indicates the relations of these velocities on starting, i.e. when the shaft 112 is at a standstill, V indicates the relations of these velocities in a range of medium speed of shaft 112, VI indicates the relations of these velocities at maximum speed of the shaft 112.

The cases IV and VI are the limit cases between which the whole regulating process is going on.

The changes in absolute turbine exit velocities $c_2$ show the strong change in the torque of the flow before the pump wheel. This torque is very high at IV whereas it nearly falls to zero at VI.

As seen in FIGURE 1, the hydraulic torque convertor consists of a pump or impeller 108 driven from an outside source of power (not shown), a set of fixed guide vanes or a stator 117 which is rigidly fixed to the housing of the torque convertor, and a turbine 110 driven by the fluid energy produced by the pump 108.

The pump 108 rotates about the axis of shaft 107 and imparts a velocity to the fluid within the toroid. The pump is generally of the centrifugal type—that is, it takes in the fluid at its minimum diameter and discharges it at its maximum diameter. The flow of fluid about the core of the toroidal circuit is, therefore, in the direction of the arrows indicated in the flow circuit of FIGURE 1. We shall designate the solid ring 109a supported in the center of the flow chamber by the stator blades 117 as the core of the toroid.

The guide vanes of the stator 117 within the toroidal fluid circuit are designed to remove the tangential component of flow of the fluid with which it leaves the pump 108 so that it enters the turbine in a substantially axial direction. As has been stated, the pump 108—revolving about its own axis—takes in fluid at its minimum diameter and discharges it at its maximum diameter. When the fluid is discharged, it has a velocity component which is radial with respect to the pump and which causes the fluid to flow around the core of the toroid, as indicated by the flow arrows in FIGURE 1. This radial component is created by the centrifugal action of the pump. The fluid at discharge also has a component of velocity which is tangential with respect to the pump 108 and which gives the fluid a whirling motion within the toroid in a direction along its core. This tangential component of fluid velocity, multiplied by the length of the radius of its action about the axis of shaft 107 of the toroid, is technically known as "whirl" in the field of fluid mechanics. Thus, when the fluid leaves the pump 108 it has a tangential velocity or "whirl" in one direction which is received by the vanes of stator 17 and its direction is diverted or redirected so that the fluid enters the turbine in a substantially axial direction. The redirection of the fluid by the stator vanes, then, allows the turbine 110 to rotate in a direction opposite to the direction of rotation of the pump 108.

The construction of the turbine 110 is critical in one respect. It must be a turbine with reaction blading. The blades of the turbine should also, for optimum efficiency, be disposed at substantially the minimum diameter of the toroidal flow circuit. The blades of the turbine 110 must be the reaction type so that the turbine 110 may be driven to an angular velocity well beyond the angular velocity of the pump 108.

It may be well to note generally at this point the basic distinction in types of turbine blades—that is, reaction blades and impulse blades. An impulse turbine extracts energy from flowing fluid as a result of the fluid mass striking the blade with a certain kinetic energy which is dependent upon the mass of the fluid and its velocity. Since the energy is transferred by impact or impulse, the blade of the impulse turbine can only be driven to a maximum circumferential velocity which is equal to the tangential component of the velocity of the fluid which impinges upon it and at this velocity, there is no impulse transferred to the blade. The blades of an impulse turbine are usually relatively parallel—that is, the cross-sectional area of the space between the blades is relatively uniform along the entire length of the blades.

The reaction turbine depends upon another principle for its operation. It is designed to utilize the pressure differential across the turbine to increase the velocity of the fluid passing between the blades. Thus, the blades are constructed so that the area between the blades—rather than being uniform as in an impulse turbine—is constricted at some point to cause an increase in fluid velocity at that point and so a resulting increase in velocity as the fluid leaves the turbine blades relative to the turbine blades. The turbine is driven by the reaction to this change in velocity much as a rocket engine operates. Turbine blades have been designed which utilize a combination of the two principles to some extent; however, the turbine blades of the instant invention are substantially complete reaction blades—that is, they derive their driving force from the reaction principle and do not depend upon the impulse principle.

Since the blades of the present turbine are reaction blades, the turbine 110 of this invention can be driven to an angular velocity well beyond the angular velocity of the pump 108 by the moving fluid in the toroidal circuit. Thus, in the present invention, the turbine 110 may be driven more than three times as fast as the pump 108. Most torque convertors built up to this time have utilized impulse turbines. It has been traditional that an impulse turbine provides a more efficient power turbine if the turbine is not contra-rotating to the pump. Applicant has discovered that it is more important to utilize the high speed capabilities of a reaction turbine in a torque convertor with a contra-rotating pump and turbine and thus obtain efficient power transfer over a wide range of speeds rather than concentrate upon a peak efficiency at a given design point, as is done in the design of conventional torque convertors.

The advantages of a reaction turbine—to allow high driven speeds—may be appreciated. We shall defer a discussion of the reason for placing the turbine blades at substantially the minimum toroid radius for the present. This point will be explained further on in this disclosure.

Referring now to FIGURES 2 and 3, we should like to point out some features of the torque converter in more detail. FIGURE 2 shows the blade cross-sections of the various convertor elements. The sections of FIGURE 2 are taken approximately on the flow circle arrows of FIGURE 1 and are viewed from a point in the core 109a of the toroid. Thus, the elements of the convertor are, in effect, "unrolled" and placed side by side in FIGURE 2. The blades in FIGURE 2 (I) are those of the stator 117, the blades of FIGURE 2 (II) are those of the turbine 110 and the blades of FIGURE 2 (III) are those of the pump 108. The arrows at the top of FIGURE 2 indicate the directions of the circumferential velocities of the turbine 110 (II) and the pump 108 (III). It will be noted that they rotate in opposite directions. The blades of the stator (I) are curved to remove the tangential velocity of the fluid as it leaves the pump. Thus, as the fluid leaves the pump blades (right side of FIGURE 2 [III]), it has a tangential component in a downward direction, corresponding to the direction of the circumferential velocity of the pump wheel.

The fluid, with a tangential component downward (FIGURE 2), enters the stator blades (left side FIGURE 2 [I]). Notice that the stator blades are curved upward at their extreme left side (FIGURE 2 [I]) to receive the fluid that has a downward tangential component with a minimum of shock and resistance. As the fluid passes through the guide vanes, the direction of its tangential component will be redirected so that it emerges from the stator blades (I) with a negligible tangential component of flow in an upward direction, or substantially axial with respect to the turbine in a stalled condition.

The form of the turbine blades is shown in FIGURE 2 (II). They have the shape of an air foil and are slightly curved. The area of fluid flow between the blades is reduced as the fluid passes through the turbine from left to right (FIGURE 2 [II]) indicating the reaction type turbine blades.

FIGURE 3 shows velocity diagrams of various fluid velocities in the toroidal flow circuit under certain driving conditions. The three parts of FIGURE 3 (IV), (V) and (VI), show certain designated fluid velocities at three different driving conditions of the convertor. FIGURE 3 (IV) shows the velocities when the convertor pump 108 is operating at maximum angular velocity and the turbine 110 is in a stationary or stalled condition. FIGURE 3 (V) shows the same velocities when the turbine 110 and the pump 108 are rotating at approximately the same angular velocities in opposite directions, and FIGURE 3 (VI) shows the velocities when the turbine angular velocity is about three times as great as the pump angular velocity.

In both FIGURES 2 and 3, the velocities $C_1$, $C_2$, $W_1$, $W_2$ and $W_3$ are plotted. $C_1$ is defined as the absolute velocity (magnitude and direction) of the fluid leaving the stator blades. As used in the convertor art, the absolute velocity is the velocity with respect to the convertor housing. $C_2$ is the absolute velocity of the fluid leaving the turbine 110. $W_1$ is the relative velocity of the fluid with respect to the turbine 110 as it enters the blades of the turbine 110. $W_2$ is the relative velocity of the fluid with respect to the turbine 110 as it leaves the turbine 110. $W_3$ is the relative velocity of the fluid with respect to the pump 108 as it enters the pump 108.

It will be noted that the fluid always leaves the stator with a fixed angle, as shown by $C_1$ in all cases. The magnitudes of the velocities in each of the three separate portions (IV), (V) and (VI) of FIGURE 3 are not quite to scale with respect to the other portions. For example, the length of $C_1$ in FIGURES 3 (V) and 3 (VI) should actually be slightly less than $C_1$ in FIGURE 3 (IV), since, as the pump slows down, the magnitude of the fluid velocity will decrease somewhat. In FIGURE 3 (IV), $C_1$ equals $W_1$ since the turbine is stalled. For the same reason, $C_2$ equals $W_2$. In this condition, the turbine blades redirect the fluid velocity much as the stator blades did. Thus, the axial flow which enters the turbine 110 is given a tangential component of fluid velocity as it emerges from the turbine 110. It is at this stalled condition that the greatest torque is induced upon the turbine 110. As is also apparent from FIGURE 3 (IV), the reaction blades of the turbine 110 greatly alter both the magnitude and direction of the fluid velocity. Due to the constricted flow passages between the turbine blades, the magnitude of the outlet velocity $C_2$ is almost three times as great as the inlet velocity $C_1$. The reaction from the large tangential component of this outlet velocity exerts a high torque upon the turbine. The double dotted lines indicate $W_3$ in all three portions of FIGURE 3.

In FIGURE 3 (V), the turbine 110 has been set in motion and the pump 108 has been slowed somewhat, so that they are running at approximately the same angular velocity in opposite directions. It will be noted that since the turbine 110 is now running, $C_1$ and $W_1$ are no longer the same. The vector difference between $C_1$ and $W_1$ indicates the circumferential velocity of the turbine as the fluid enters the turbine. The vector difference between $C_2$ and $W_2$ indicates the circumferential velocity of the turbine as it leaves.

FIGURE 3 (VI) shows the turbine rotating near its highest r.p.m. Thus, the vector difference between $C_1$ and $W_1$ is greater in magnitude (as is the difference between $C_2$ and $W_2$) than the corresponding vector differences on either FIGURE 3(IV) or FIGURE 3(V).

At this point another characteristic of the present torque convertor should be explained. Since the pump 108 and turbine 110 rotate in opposite directons, the fluid leaving the turbine 110 has a tangential component of velocity which is in the same direction as the rotation of the pump 108. This condition is especially pronounced at a turbine stalled condition, as represented by FIGURE 3(IV). The tangential component of the fluid leaving the turbine 110 is the projection of $C_2$ on the vertical line of FIGURE 3(IV). This tangential component is the result of the fluid passing through the turbine. For convenience, we shall term it "residual whirl" since it is the tangential component remaining in the fluid after the primary work of exerting a driving force in the turbine has been completed. This "residual whirl" is greatest at the turbine stalled condition and its high magnitude is due to the reaction blading of the turbine which causes the fluid to leave the turbine at a small acute angle to the plane of the turbine. As the turbine accelerates, the "residual whirl" is reduced until it is at a minimum when the turbine is rotating at its highest speed.

The "residual whirl" of the fluid is fed back into the pump since the pump inlet is located immediately adjacent the turbine outlet. Thus, when the turbine is stalled, the pump has less work to perform in imparting a tangential component of velocity to the fluid than it has when the turbine is running at high speed. If a constant power source were to drive the pump, the pump would naturally slow down as the turbine r.p.m. increased since it would have to perform more work upon the fluid when the turbine is at higher r.p.m. than when it is stalled. This is another feature which makes the instant torque convertor particularly well suited to a power-shunt transmission. These characteristics will become more apparent as this disclosure progresses.

As the fluid progresses around the toroidal flow circuit, the majority of the flow circuit losses take place between the pump outlet and the turbine inlet as the tangential component of the fluid velocity is removed by the guide vanes. The present invention provides a reaction turbine blade design which has high blade efficiencies over a wide range of turbine speeds so that the flow losses through the turbine itself are at a minimum.

*Second Embodiment (FIGURE 4)*

Figure 4:
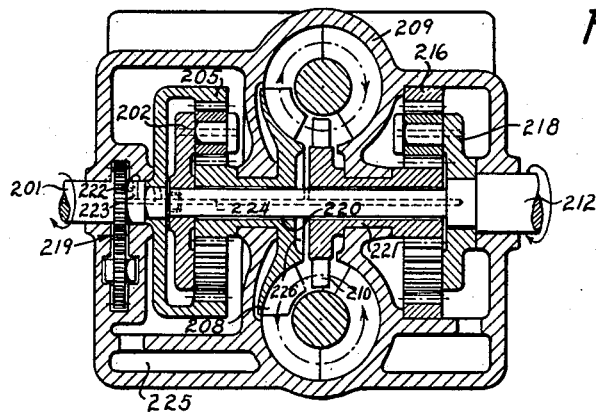
FIGURE 4 is a sectional view of a second embodiment of the invention utilizing an axial flow turbine equipped torque convertor.

Whereas in the designs of the transmission mechanism according to FIGURE 1 the main shaft 101 and the driven shaft 112 are disposed on the same side of the transmission concentrically about each other, which design is often used for motor cycle shifting gear mechanisms, FIGURE 4 shows a design where the main shaft 201 and the driven shaft 212 are disposed on opposite sides and which is used in motor vehicle gear mechanisms.

In the design according to FIGURE 4, the main shaft 201 is connected to the ring gear 205 of the differential gear mechanism, and the planet carrier 202 is rigidly connected to the driven shaft 212. The gear mechanism between turbine 210 and driven shaft 212 is in this instance also constructed as planetary gearing, but it is disposed on the other side of the torque convertor. The planet carrier 218 is fixed to the driven shaft 212, while the ring gear 216 is fixed to the housing 209.

So long as the transmission transmits power from the main shaft 201 to the driven shaft 212, the latter shaft 212 will always run at a lower rate than the main shaft 201, and the pump wheel 208 rotates in an opposite direction with respect to the main shaft 201. The turbine wheel 210, however, rotates in the same direction as the driven shaft 212 since the planet carrier 218 is connected with the driven shaft.

As shown in FIGURE 4, a gear oil pump 219 is fitted into the housing of the bearing of the main shaft 201. The function of this pump 219 is to supply all the bearings and gear wheels with oil and to keep the fluid circuit of the torque convertor filled with oil. It must continuously feed to the fluid circuit a quantity of fluid equal to such quantity of oil as escapes from the bearings of the pump shaft 220 and of the turbine shaft 221 as a result of the high pressure prevailing in the flow circle.

The oil of said gear pump is forced through an annular space and radial bores 222 into axial bores 223 of the main shaft 201. From there it flows on to the axial bores 224 of the driven shaft 212 whence the gears, bearing places and the fluid circuit of the torque convertor are fed with oil. The oil collects in the oil containers or reservoirs 225 from which it is again exhausted by the gear oil pump 219.

To avoid the formation of air pockets within the fluid circuit of the torque convertor the pump or impeller 208 has on the side adjacent the turbine rotor 210 radial blades 226 by means of which the pressure in the fluid circuit is increased and the air is expelled from it. The torque convertor of the FIGURE 4 embodiment is otherwise identical in structure and operation to the FIGURE 1 embodiment.

*Third Embodiment (FIGURE 5)*

Figure 5:
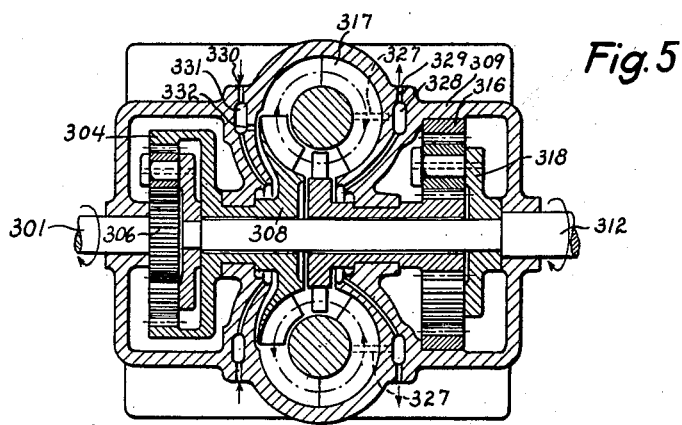
FIGURE 5 is a sectional view of a third embodiment, utilizing an axial flow turbine equipped torque convertor.

FIGURE 5 shows a design of the power-shunt transmission to be used when high speed of the main shaft 301 is desired to be so transmitted as to impart low speed to the driven shaft 312, for example in case the main shaft 301 is driven by a high speed turbine. Here the main shaft 301 is connected to the sun gear 306 of the input differential gear mechanism and the ring gear 304 to the pump or impeller 308.

The configuration shown in FIGURE 5 is designed to operate with air rather than liquid as the fluid medium for the torque convertor. This configuration is not contemplated for use with an internal combustion engine but rather with a very high speed gas or steam driven turbine as the prime mover. The actual pump speed must be very high so that that portion of the torque which is impressed upon the pump of the torque convertor will be utilized by the pump in the convertor. Since the fluid medium is of a much lower density, the pump must rotate at a very high speed. If the convertor using air as the medium were used with an internal combustion engine, it would certainly overspeed the engine. Contemplating the use of the FIGURE 5 configuration with a very high speed prime mover, the planetary gear of the transmission actually has a gear reduction between the transmission input and the pump of the torque convertor.

If part of the air is continually replaced, this may ensure a very efficient refrigeration. FIGURE 5 shows how this exchange of air is going on. Part of the air circulating in the fluid circuit escapes through openings 327, which are disposed at those places of the guide blades 317 where there is danger of reflux, toward the annular collecting chamber 328 of the housing 309 to reach the open air through bores 329. At another point of the fluid circuit where low pressure is prevailing, air is drawn in from the surrounding atmosphere through bores 330, an annular collecting chamber 331 and bores 332. The outlet of air through the bores 327 simultaneously serves to exhaust boundary layers at the guide blades to avoid reflux. The torque convertor of this embodiment is otherwise identical in structure and mode of operation to the previously described embodiments.

*Fourth Embodiment (FIGURES 6-12)*

Figure 7:
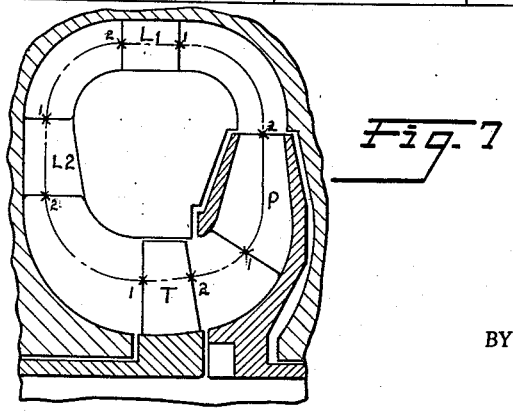
FIGURE 7 is a diagrammatic illustration of a radial section through the torque convertor of the transmission of FIGURE 6.

FIGURE 6 illustrates a power-shunt transmission embodying an improved hydraulic torque convertor shown in FIGURES 7 and 8 and the characteristics of which are shown in the graph of FIGURE 9. The convertor and its circuit as illustrated in FIGURE 7 is with one exception later discussed a mirror image of the hydraulic torque convertor as illustrated in FIGURE 6. FIGURE 8 shows complete velocity diagrams for the improved convertor. It also shows cross-sections of the blades of the individual convertor elements taken on the flow circle line indicated in FIGURE 7 and, as in the case of FIGURE 2, viewed from a point within the core of the toroidal flow circuit. It will be noted that only minor changes have been made from the convertor disclosed in FIGURES 1-3. Notably, the blades of the pump have been redesigned to provide a more efficient blade profile; the single set of sharply curved guide vanes of the FIGURE 1 embodiment has been replaced by two sets of less sharply curved vanes which accomplish the same result and which are easier to manufacture; and the core of the toroidal flow chamber has been shifted slightly toward the outer radius of the flow toroidal to equalize the flow velocity component around the core of the toroid.

The blade cross-sectional profiles are designated in FIGURE 8, as L2 for the radial guide vanes, T for the turbine blades, P for the pump blades and L1 for the axial guide vanes and immediately below each blade profile, the velocity diagrams for that blade are drawn. In FIGURE 8, the flow of fluid through the blade profiles is from left to right. Thus, the velocity diagrams on the left side of each individual block represent the velocities upon entering the particular blade profile below which the block is situated and bear the subscripts 1. The diagrams to the right of the individual blocks represent the fluid velocities upon leaving the blade above and bear the subscripts 2. Throughout the velocity diagrams of FIGURE 8, the letter C represents the absolute velocity of the fluid with respect to convertor housing; the letter W represents the relative velocity of the fluid with respect to the particular blade profile shown above; and U represents the circumferential velocity of the rotating member (pump or turbine) which carries the blade profile displayed above the velocity diagram in question. The velocity diagrams are drawn to a scale of one millimeter equal to a velocity magnitude of one meter per second. The projection on the vertical of the absolute velocity $C_2$ emerging from the turbine blade has been drawn on the diagrams and is represented by 0. This projection is the tangential component of the absolute velocity and is the "residual whirl," as defined earlier.

The velocity diagrams of FIGURE 8 are shown for three driving conditions of the torque convertor. The driving conditions are defined in the extreme left column of the drawing. Thus, all the velocity diagrams shown in the first horizontal row of blocks are for one driving condition, all those in the second row are for a second driving condition, and those in the third row for a third condition. In defining the driving conditions, $n_t/n_p$ is the ratio of the angular velocity of the turbine to the angular velocity of the pump. Thus, in the first driving condition, $n_t/n_p=0$ which occurs when the angular velocity of the turbine is zero or the turbine is stalled; $U_t$ is the circumferential velocity of the turbine in meters per second which is zero for the first driving condition; $U_{p1}$ is the circumferential velocity of the pump inlet which, for the first driving condition, is 26.6 meters per second; and $U_{p2}$ is the circumferential velocity of the pump outlet which is 45.2 meters per second for the first driving condition. $P_1$ and $P_2$ are indicated in FIGURE 7 as the pump inlet and outlet points respectively and the circumferential velocity of these two points varies at a constant angular velocity of the pump due to the difference in their radii from the center of rotation of the pump.

To facilitate a clear understanding of the velocity diagrams of FIGURE 8, I will follow through a complete circuit of the fluid, as shown in the diagrams of FIGURE 8. Taking a condition where the turbine is stalled, the first horizontal row of velocity diagrams applies. In this condition, there is a certain power input to the pump element. Starting at the left of the top horizontal row, the first velocity digaram shows the absolute velocity of the fluid $C_1$ entering the fixed guide vane $L_2$ at a fixed angle and velocity. The guide vane $L_2$ changes the velocity direction slightly but does not materially alter its magnitude and it emerges with velocity $C_2$. There is substantially no fluid pressure change across the guide vane $L_2$. The fluid leaving the guide vane $L_2$ enters turbine with an absolute velocity $C_1$ (second block) which is substantially equal to the velocity $C_2$ leaving the guide vane $L_2$. Since the turbine is at rest, the absolute velocity $C_1$ is also the relative velocity $W_1$ of the fluid with respect to the turbine blade. Generally, the absolute velocity of the fluid is equal to the vector sum of the relative velocity and the circumferential velocity of the blade or:

$$C = W + U$$

In the present case, with the turbine stalled, the circumferential velocity of the turbine $U_1=0$ so that $C_1=W_1$.

As the fluid passes through the turbine, the reaction blading causes the direction of the velocity to be changed and the magnitude to be increased greatly so that it emerges with a velocity $C_2$. The tangential component 0 of this velocity $C_2$ is the "residual whirl" and it is at its maximum when the turbine is at rest. Since there is a great increase fluid velocity as the fluid passes through the turbine, there is a corresponding pressure drop across the turbine. The absolute velocity $C_2$ with which the fluid leaves the turbine is reduced in magnitude slightly by flow losses and by the slightly larger radius of the pump inlet, as compared to the turbine outlet, before it reaches the pump but its direction remains fixed. The fluid then enters the pump with an absolute velocity $C_1$ (third block).

Since the pump inlet has a circumferential velocity $U_1$, the velocity of the fluid relative to the pump blade is represented by the vector difference of $C_1$ and $U_1$ or $W_1$. The fluid passes through the pump and its velocity magnitude and direction are altered slightly. Since the pump outlet is farther from the pump axis than the pump inlet is, the circumferential velocity $U_2$ of the pump outlet is greater than that of the pump inlet $U_1$. The fluid then leaves the pump with an absolute velocity $C_2$ and a relative velocity $W_2$. It may be well to note at this point that the direction of the relative velocity with which the fluid leaves any blade element is always substantially fixed by the direction of the blade—that is, the fluid leaves with a relative velocity along the surface of the blade.

After leaving the pump blade, the fluid enters the guide vane $L_1$ with an absolute velocity $C_1$. The fluid is redirected and emerges with an absolute velocity $C_2$. It should be noted that the greatest losses in the fluid flow circuit occur as the fluid passes from the pump outlet to the outlet of the fixed guide vanes, during which passage the tangential component of the fluid velocity is removed.

The velocity diagrams for the other two running conditions are shown below the condition of $n_t/n_p = 0$ and may be followed through in a like manner. It will be noted that the magnitude of the velocity $C_2$ leaving the pump diminishes as the pump slows down. It will also be noted that the "residual whirl" 0 of the fluid emerging from the turbine diminishes as the turbine speeds up. In the light of these velocity diagrams, it may be well to explain at this point why it is not desirable to place the axial turbine blades at the greatest diameter of the flow toroid. Primarily, it is a question of the efficiency.

The most efficient pump for a torque converter is one in which the fluid passes through the pump centrifugally—that is, from a minimum diameter inlet to a maximum diameter outlet. Further, to make the turbine run in a direction opposite to the pump direction, the fixed stator blades must be located between the pump outlet and the turbine inlet. If the turbine were located at the maximum toroid diameter, the guide vanes of the stator would have to be crowded between the pump outlet and the turbine. Further, since an important feature of this invention requires that the "residual whirl" of the fluid emerging from the turbine be utilized by the pump, it is essential that the turbine outlet be located immediately adjacent the pump inlet so that the flow losses between the turbine and pump may be minimized. Since it is impossible to further minimize the losses in the guide vanes, it is necessary to reduce the other losses as much as possible. A little study will indicate that a turbine with the blades at the maximum toroidal diameter is irreconcilable with the foregoing conditions for most efficient operation.

Since there is a high pressure drop across the turbine of the present invention, it is necessary to make up fluid to the flow circuit to prevent cavitation in the circuit. The cavitation is most likely to occur at the pump inlet because of the high pressure drop across the turbine. The make up fluid is added to the circuit at the pump inlet to rectify this situation. The system for making up the fluid to the circuit will be explained in some detail when the whole transmission is described in reference to FIGURE 6.

FIGURE 9 is a graph which shows in full lines certain characteristics of the fluid torque converter of FIGURES 6 and 7. For comparison, corresponding curves of a standard, three element, single stage, torque convertor have been added to the graph in dash lines to point up the differences and advantages of the present invention.

Curve 1 of FIGURE 9 represents the ratio of the turbine torque to pump torque of the present invention plotted against the ratio of the turbine r.p.m. to pump r.p.m. Curve 4 of FIGURE 9 shows the same curve for a standard torque converter. The cordinates have been indicated as ratios to show the converter characteristics in a dimensionless relationship. The standard torque converter usually employs an impulse turbine, or at least a turbine operating on a combination of the impulse and reaction principles with the emphasis on the impulse quality. Being at best an impulse turbine with only a reaction tendency, the turbine of the conventional converter cannot be driven beyond the speed of the pump to any great extent. In order for torque to be transferred to the turbine, the turbine must be accelerated by the fluid from the pump. Thus, in a conventional converter, as shown by curve 4 in FIGURE 9, the torque transferred to the turbine must drop to zero when the turbine can no longer be accelerated by the pump. This condition occurs in a conventional converter when the turbine speed reaches, at best, a speed 1.2 times the pump speed. Since the turbine of the instant invention is of the reaction type, the turbine can be driven up to 3.7 times as fast as the pump, as shown by the curves 1 of FIGURE 9. This characteristic is very important in the transmission of the present invention as will be fully clarified.

Comparing curves 1 and 4 of FIGURE 9, it will be noted that the ratio of the torque output by the turbine to torque input to the pump for both convertors is at a maximum for a turbine stalled condition. This maximum value is slightly higher for the instant convertor. The important feature, however, is that the stalled turbine torque of the instant convertor is as high as the stalled turbine torque of the conventional convertor. The next significant point on the curves is the point where torque multiplication ends, or where $M_t/M_p$ becomes equal to 1. This occurs at a speed ratio of $n_t/n_p = .75$ for the instant convertor and .85 for a conventional convertor—here again not enough of a difference to be significant. Beyond a turbine to pump speed of 1.2, the difference in the curves becomes significant. The conventional convertor no longer transmits power and torque. The instant convertor continues with torque transmission, not a multiplication, however, up to a speed ratio $n_t/n_p$ of 3.7. It also continues to transfer power over this range of speeds. Thus, at a turbine to pump speed ratio well beyond the range at which a convention convertor ceases to operate, the present convertor continues to transmit power and torque efficiently.

The efficiency curves for the instant convertor and for a conventional convertor are designated 2 and 5 respectively on FIGURE 9. The coordinates for the efficiency curves are the ratio of turbine speed to pump speed $n_t/n_p$ against a percent efficiency scale which appears to the right of FIGURE 9. Since the efficiency is the percentage of the power output to the power input of the torque convertor, the conventional convertor is limited to a $n_t/n_p$ of slightly larger than unity because at that point, the fluid ceases to do work upon the turbine and the efficiency drops to zero. The instant convertor has an efficiency range extending over its entire driving range of $n_t/n_p = 3.7$.

The turbine of a conventional convertor must be designed for a peak efficiency at a rather reduced speed range. This is due to the fact that the turbine blade losses are high whenever the relative velocity of the fluid with respect to the blade at entry to the blade is outside a certain efficient blade entry angle. In designing the turbine of the instant convertor, the inventor found that he was able to design a reaction blade that was efficient over a wide range of turbine speeds. While the conventional convertor reaches a higher peak efficiency, the present convertor has a relatively high efficiency over a very wide range of speeds. For example, the instant convertor has an efficiency of 60% or better over a speed ratio range of $n_t/n_p = .4$ to $n_t/n_p = 2.45$ while the conventional convertor has an efficiency of 60% or better over the limited range of ratios $n_t/n_p = .38$ to $n_t/n_p = 1.08$.

The advantages of these efficiency characteristics will be discussed in some detail in connection with the whole transmission.

Curves 3 and 6 of FIGURE 9 show the ratio of the torque required by the pump to maintain the pump at a constant r.p.m. at various values of $n_t/n_p$ to the torque required by the pump at $n_t/n_p=1$, as plotted against the ratio of turbine speed to pump speed $n_t/n_p$. The pump torque is indicated on the same scale as the ratio of turbine torque to pump torque and is dimensionless in that it indicates a ratio of torque required with a denominator of the torque required at $n_t/n_p=1$. The curve 3 of FIGURE 9 shows that the pump of the instant convertor requires a greater torque to maintain a constant r.p.m. as the turbine increases in speed with respect to the pump. This is due to the fact that the "residual whirl" from the turbine is very high when the turbine is stalled or at low speeds. As the turbine increases in speed, the "residual whirl" diminishes and the pump requires more force to maintain its circumferential velocity. In a conventional non-contra-rotating torque convertor, there is no "residual whirl." In a contra-rotating torque convertor without reaction blading, the "residual whirl" is negligible. The exhaust from the turbine, which in a conventional torque convertor runs in the same direction as the pump, acts to oppose the direction of motion of the pump rather than to aid it. Further, in most conventional torque convertors, the stator blades are interposed between the turbine exhaust and the pump inlet so that the pump receives fluid with a fixed direction velocity. For these reasons, the constant r.p.m. pump torque curve 6 of FIGURE 9, which shows a characteristic of a conventional torque convertor, indicates that the pump torque required to maintain a constant angular velocity of the pump will be very nearly constant for all values of the ratio $n_t/n_p$. In a contra-rotating torque convertor without reaction blading, the torque required by the pump might be slightly less at the turbine stalled condition; however, there would be no steep slope of the curve as shown in curve 3 of FIGURE 9 for the present convertor.

In the light of the foregoing detailed explanation of the construction and characteristics of the novel hydraulic torque convertor, I shall now proceed with a description of its use in the present transmission of FIGURE 6. I will show why the convertor, which is novel per se, is particularly adapted to be combined with differential gearing in a power-shunt transmission and why such a combination produces results which were impossible to achieve with the old combination of a conventional torque convertor and a differential gear set.

As shown in FIGURE 6, the transmission consists of a rotatable input shaft 410 which is drive connected through spline connections 411 to the internal ring gear 412 of a planetary gear set 413. The ring gear 412 meshes with a plurality of equi-angularly spaced planet pinion gears 414 which are carried by the planetary carrier 416 and which in turn are in constant mesh with the sun gear 418. The carrier 416 is non-rotatably fixed to the shaft 420 which may be considered, for the purposes of this discussion, the transmission output shaft. The sun gear 418 is non-rotatably secured through spline connection 421 to the pump 422 of the fluid torque convertor 423. The pump 422 is carried by the axially elongated hub or sleeve of sun gear 418 which is rotatably disposed about the output shaft 420. The turbine rotor 424 of the fluid convertor is also provided with an axially elongated sleeve or hub rotatably mounted on shaft 420. Integral with the end of the sleeve of turbine rotor 424 is a gear 426 which is in constant mesh with outer annular gear 427 of a one-way clutch 428. The other member 429 of the one-way clutch 428 is fixed to a shaft 430 which non-rotatably carries gears 431 and 432. Gear 431 is constantly enmeshed with gear 433 which is, in turn, non-rotatably secured to output shaft 420. Gear 432 is constantly enmeshed with an idler gear (not shown) which is in constant mesh with gear 434. Gear 434 is rotatably mounted on shaft 435 which is, in effect, a coaxial extension of shaft 420 when the transmission is being driven in the forward direction.

An axially shiftable jaw clutch member 436, which is internally splined to shaft 435, may be axially shifted by fork 437, for selective engagement with the complementary jaw clutch teeth on either gear 433 or gear 434 to effect either a direct drive connection between shafts 420 and 435 or a reversal of shaft 435 through reverse gearing 433, 431, 432, the idler gear and 434. At the lower left side of FIGURE 6, a gear pump is indicated at 438. This pump 438 consists of two gears, 439 and 440, meshed in a conventional manner within a pump casing and is utilized to supply make up fluid to the convertor flow toroid. The pump 438 is driven by the gear 442 which is fixed to the shaft 443 of gear 440 and which meshes with a gear 444 formed on the support 445 for ring gear 412. The entire lower part of the transmission casing serves as a hydraulic fluid reservoir for the make up fluid for the torque convertor. This fluid, which fills the transmission housing to just below the level of the circumference of the ring gear 412, is drawn into the pump 438 through conduit 448 in the lower portion of the transmission housing. It is pumped under pressure through pump 438 into conduit 450 which communicates with the pump 438 and carries the fluid into chamber 452 which is formed within the hub of the ring gear support 445. Small holes 454 formed radially in the hub of ring gear support 445 allow the chamber 452 to communicate with an annular chamber 453 around the hub of ring gear support 445 into which conduit 450 empties.

The shaft 420 has a bore 456 which conducts the fluid under pressure from chamber 452 to an annular chamber 458 formed in the pump unit. This chamber 458 is, in effect, a centrifugal air separator. It contains radial blades 459 which, as the pump 422 rotates, cause the heavier hydraulic fluid to pass radially from the chamber 458 into the toroidal flow circuit and which allows the entrapped air in the fluid to escape along the shaft 420 so that it will not enter the flow toroid. The purged fluid is then conducted to the fluid flow toroid immediately ahead or upstream of the blades of pump 422, as was mentioned previously, to prevent cavitation in the fluid flow toroid.

The torque convertor shown in FIGURE 6 differs from that of FIGURE 7 and those of FIGURES 1, 4 and 5 in that it contains a brake 460 which consists of an annular piston 461 disposed within the core 462 of the toroid. The brake 460 is utilized to stop the rotation of the pump 422 during certain ranges of the transmission driving speeds. This brake is actuated by fluid under pressure from the pump 438 which is directed to the annular area 462 behind the annular piston of the brake in response to a signal from the transmission governor 463. Note the O ring seals 464 and 465 on the annular piston 461 to isolate the brake fluid chamber 462 behind the annular piston 461 from the fluid flow toroid. The purpose of this brake 460 will be discussed more fully hereinafter.

Having described the general construction of this transmission, I shall fully describe its operation and its characteristics. As has been stated, the input shaft 410 is rigidly connected to the internal ring gear 412 of the differential gear set 413. Considering the transmission in its most usual use, the input shaft 410 will be driven by an internal combustion engine and the transmission will provide torque control to the driving wheels of a motor vehicle. It might be best to describe the operation of the transmission throughout the vehicle speeds from a condition where the vehicle is at rest to a condition where the vehicle is at its maximum road speed. We shall do this during the course of the following discussion.

Primarily, the measurable input to the transmission consists of the power of the engine measured in horsepower and the torque supplied by the engine measured in pound feet. The torque of most internal combustion engines is practically constant over the entire range of engine r.p.m., being slightly lower at very low and very high engine r.p.m. and being slightly higher in the medium speed range. The torque variation, however, over the entire range of available engine r.p.m. is not large and for the purposes of this discussion, shall be considered as substantially constant. The engine power, on the other hand, being the amount of work done in a given time, is a direct function of the engine r.p.m. The power of an engine may also be defined as the torque output multiplied by the angular velocity of the engine. Thus, if we consider a substantially constant output torque, the direct relation between power and engine r.p.m. can be appreciated.

The purpose of any transmission is to transmit power and torque from the engine to an area where it will be utilized and, at the same time, to alter the power and torque so that when it reaches the area of use, it will be in a form which may best be utilized. The present transmission is generically termed a power-shunt transmission. This means that the power—and the torque—take two parallel paths to the area of use or the output shaft. The input power and torque are split by the differential gear 413. Part of the power and torque takes a path through carrier 416 of the planetary system, and part through the sun gear 418. The sun gear 418 is integral with the pump 422 of the fluid torque convertor 423 and so the portion of the power and torque which takes a path through the un gear 418 is transmitted through the fluid torque convertor 423. That portion of the power and torque which takes a path through the planetary carrier 416 of the differential gear 413 is directly transmitted mechanically to the output shaft 420 since the carrier 416 is splined to the shaft 420.

The turbine 424 of the torque converter 423 is connected to the shaft 420 by gears 426 and 427, the one-way clutch 428 and the spur gears 431 and 433. Thus, the input power which was split and transmitted over two parallel paths is added at the output shaft 20. The torque, which had taken the two paths, is also added at the output shaft 420 of the transmission. By utilizing a differential gear such as 413 to split the input power and torque, the multiple of the input torque transmitted through each path of the transmission remains constant. The percentage of the input power transmitted through each path, however, is a function of the speeds of the various elements. These facts will become more apparent as the description of the operation of this transmission proceeds.

Considering the transmission in a vehicle, the vehicle will start from a condition of rest where the shaft 420 of the transmission is stalled. The engine will idle and the input shaft 410 and ring gear 412 will rotate at idling r.p.m. Since the carrier 416 is stationary (it being rigidly fixed to the stalled shaft 420), the sun gear 418 will rotate in a direction opposite to the direction of rotation of ring gear 412 at an angular velocity determined by the gear ratios of the differential gearing and greater than the angular velocity of the ring gear 412. In one transmission built in accordance with FIGURE 6, gear sizes of 71 teeth for the ring gear 413, 43 for the sun gear 418 and 14 for the planetary gears 414 were used. With such a configuration, the angular velocity of the sun gear 418 at a transmission stalled condition will be 1.65 times that of the input velocity. Since the shaft 420 is stalled 100% of the input power will be transmitted to the hydraulic torque convertor 423 where, since there is no overall transmission output, it will be dissipated in heat.

During this "vehicle at rest" and all other vehicle conditions, the torque input to the transmission will be split according to the gear ratios. For the planetary gear sizes given above, 1.606 times the input torque will be impressed directly upon the output shaft 420 through the planetary carrier 416 and .606 times the input torque will be impressed upon the pump 422 of the hydraulic torque convertor 423 through the sun gear 418. These values are calculated from the gear ratios, the torque on the sun gear 418 being the ratio of the number of teeth of the sun gear 418 to the number of teeth of the ring gear 413 or $$\frac{43}{71} = .606$$

In a like manner, the torque on the planetary carrier 416 is determined by the gear formula to be the ratio of the sum of the number of teeth on the ring gear and the number of teeth on the sun gear divided by the number of teeth on the ring gear or $$\frac{71+43}{71} = 1.606$$

Further, it might be emphasized at this point that 1.606 times the input torque will be impressed upon the output shaft 420 directly at all times and .606 times the input torque will be acted upon by the hydraulic torque convertor and the gear reduction between the turbine and the output shaft. The importance of this fact will become more apparent as this explanation proceeds.

When it is desired to accelerate the vehicle, the engine speed is increased. This action increases the engine power output. It also increases the engine torque to the relatively constant torque value which exists over the normal range of engine speeds. Again, since the output is stalled, all the power is transmitted to the hydraulic torque convertor where—until the vehicle begins to move—it is dissipated. Since the turbine 424 of the torque convertor 423 is geared to the output shaft 420, the torque induced on the turbine 424, multiplied by the gear reduction between the turbine 424 and the output shaft 420, is impressed upon the output shaft 420. Because the turbine 424 is geared to the output shaft 420, it is stalled when the output shaft 420 is stalled. As may be seen from FIGURE 9, the ratio of turbine torque to pump torque $M_t/M_p$ is at a maximum when the turbine 424 is stalled or $n_t/n_p=0$. In the transmission stalled condition, then, a maximum torque is impressed upon the transmission output shaft 420. For the particular example under discussion, this maximum value is 7.80 times the transmission input torque. Considering the input torque as unity, this 7.80 torque multiplication comes about as follows.

The torque is split at the differential 413 and 1.606 times the input torque is transmitted mechanically to the output shaft 420. The sun gear 418 imparts .606 of the input torque to the convertor pump 422. Since the turbine 424 is stalled, this torque is multiplied as it is transmitted to the turbine 424 in accordance with curve 1 of FIGURE 9. Reading from FIGURE 9 for $n_t/n_p=0$, the multiplication is 2.45 from pump 422 to turbine 424. Multiplying this value by .606, 2.45×.606 or 1.48 of the transmission input torque is impressed on the turbine 424. As has been stated, the turbine 424 is geared to the output shaft 420 through gears 426 and 427, the one-way clutch 430 and gears 431 and 433. In the sample transmission under discussion, there is a gear reduction of 1 to 4.18 between the turbine 424 and the shaft 420. This gear reduction results in a 4.18 torque multiplication between the turbine 424 and the shaft 420. Thus, the 1.48 multiplication of the input torque impressed upon the turbine 424, is further multiplied by 4.18 to give a 4.19×1.48 or 6.19 multiplication of the input torque upon the shaft 420 by the path through the hydraulic torque convertor 423. This 6.19 multiplication is added to the 1.606 of the input torque impressed directly on shaft 420 by the planetary carrier 416 so that a total of 6.19+1.606 or 7.80 times the input torque is transmitted to the output shaft 420 at a stalled condition.

As long as the transmission output remains stalled, no power is transmitted through the transmission and so the overall transmission efficiency is zero. When the transmission output torque begins to have an effect on the wheels of the vehicle, the vehicle will begin to move and shaft 420 will begin to rotate. The planetary carrier 416, being rigidly fixed to shaft 420, will also begin to rotate. As carrier 416 begins to rotate, the pump 422—and so the sun gear 418—will slow down due to the increased torque required by the pump 422 as the speed of turbine 424 increases which causes a resulting decrease in "residual whirl," as explained earlier. As has been stated, the power split through the two paths of the transmission will depend upon the relative speeds of the differential gear set 413. We have calculated the ratio of power transferred to the pump 422 of the torque convertor 423 to the total input power to the transmission in terms of the relative input and output speeds of the whole transmission. This is a linear relation which, for the sample transmission, is:

$$\frac{P_p}{P_{in}} = 1 - 1.606 \frac{n_{out}}{n_{in}}$$

where $P_p$ is the power transferred to the pump of the torque convertor, $P_{in}$ is the power input to the whole transmission, $n_{in}$ is the angular velocity of the transmission input shaft and $n_{out}$ is the angular velocity of the transmission output shaft. From this equation, it is apparent that when the transmission is stalled, the value $n_{out}$ is zero, which makes the ratio $P_p/P_{in}$ equal to 1 which, in turn, indicates that the total input power is transferred to the pump.

Figure 10:
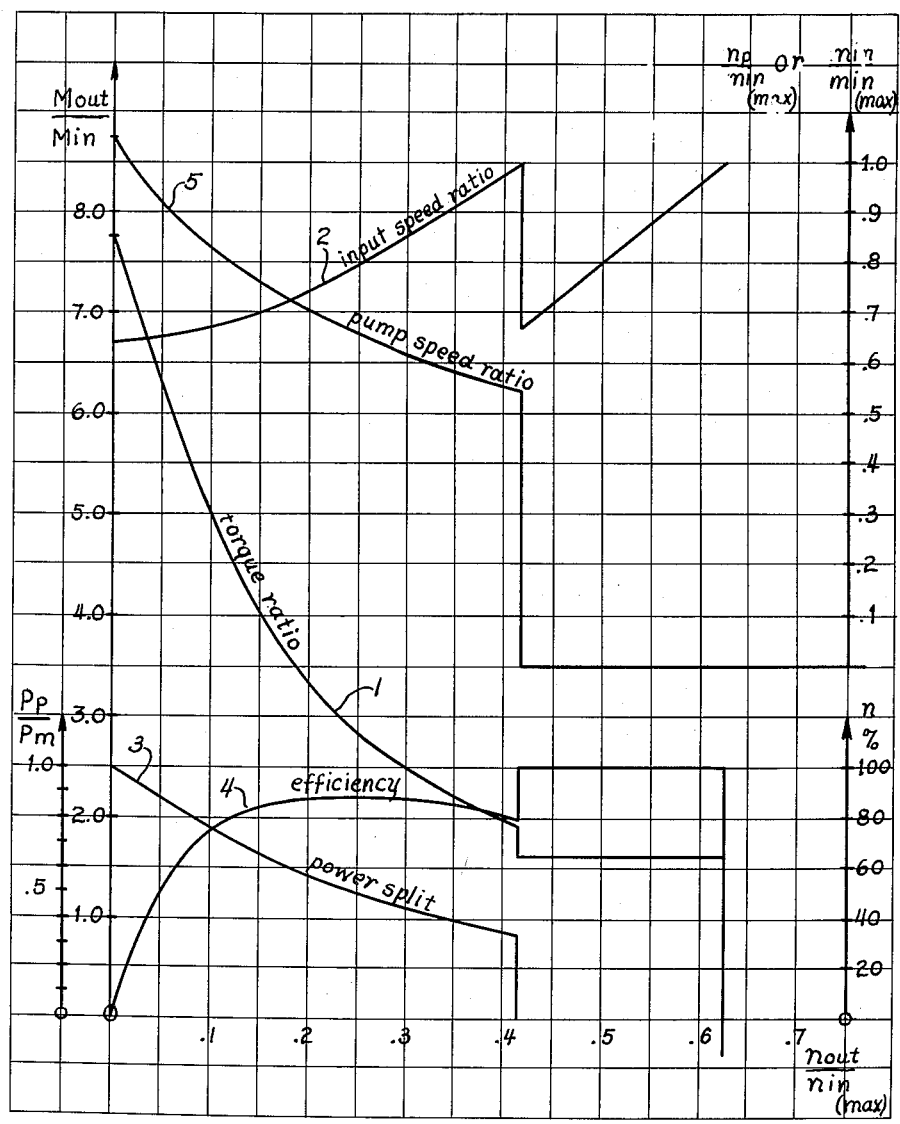
FIGURE 10 is a plot of the characteristics of the transmission of FIGURE 6.

As the vehicle begins to move and $n_{out}$ increases from zero to some small value, the ratio $P_p/P_{in}$ becomes less than one, and the power is split with the greater portion of it still being transferred to the convertor pump and the remaining portion being transferred to the output shaft directly via the planetary carrier 416. As the vehicle continues in accelerated motion, the planetary carrier 416 increases in angular velocity with a corresponding decrease in pump velocity because of the increased torque required to maintain a constant pump r.p.m. Since the turbine 424 is geared to the output shaft 420, it helps drive the output shaft 420 and as the output shaft 420 increases in speed, the turbine speed increases correspondingly. Thus, as long as the turbine 424 drives shaft 420, the ratio of turbine speed to pump speed $n_t/n_p$ is in a fixed relation to the ratio of transmission output speed to transmission input speed or $n_{out}/n_{in}$. Thus, for every value of the ratio $n_{out}/n_{in}$, there is one value for $n_t/n_p$. Bearing these points in mind, I have graphically presented the overall transmission characteristics so that I may better describe the invention and so that a basis of comparison of this transmission with the prior art is provided. FIGURE 10 shows the characteristics for a transmission built in accordance with the gear ratios given above and embodying a torque convertor with the characteristics shown in FIGURE 9.

The curves of FIGURE 10 are plotted over a ratio of transmission output speed $n_{out}$ over maximum engine speed which is, at the same time, the maximum input speed to the transmission or $n_{in}$ max. This ratio has been chosen as the basic coordinate to best display the characteristics of the instant invention. As has been stated, it is felt that the variation in torque output from an internal combustion engine over the usable range of engine speeds is not great enough to be significant. Therefore, we have assumed a constant input torque to the transmission from the engine although, of course, the power input varies with the engine r.p.m. Curve 1 of FIGURE 10 is a display of the torque multiplication or ratio of output torque to input torque $M_{out}/M_{in}$ of the sample transmission of FIGURE 6. Since the input torque is considered constant, this curve represents the torque multiplication through the transmission for various driving speeds which are attained partially as a result of motor speed variation. As has been explained above, we achieve an initial multiplication of $M_{out}/M_{in}$ of 7.80 when the vehicle is at rest. This value is at $n_{out}/n_{in}$ max$=0$ since $n_{out}$ is zero when the transmission output is stalled.

As the vehicle speed increases, the ratio of $n_{out}/n_{in}$ max increases and the overall torque multiplication decreases. Each point on the torque ratio curve 1 may be examined and the manner in which the torque multiplication takes place can be determined. Thus, if we take a condition where the turbine 424 and pump 422 of the hydraulic convertor 423 are rotating in opposite directions at the same angular velocity, the ratio of $n_{out}/n_{in}$ max is .172 which may be determined since the speeds of the pump 422 and turbine 424 are in a fixed relation to the input and output speeds. When the transmission is at $n_{out}/n_{in}$ max ratio of .172, 1.606 of the input torque is transferred mechanically through the planetary carrier 416 and .606 of the input torque is impressed upon the pump 422 of the hydraulic torque convertor 423. The .606 of the input torque on the pump is then acted upon by the hydraulic convertor with a ratio of turbine speed to pump speed $n_t/n_p$ of 1. From FIGURE 9, the torque multiplication of the convertor at $n_t/n_p=1$ is .78. Therefore, $.606 \times .78$ or .473 of the transmission input torque is impressed upon the turbine 424 of the convertor 423. Multiplying this value by the 4.18 torque multiplication between the turbine 424 and shaft 420 due to the reduction gearing, a torque multiplication of $.473 \times 4.18$ or 1.97 results from the hydraulic torque convertor. Adding this value to the 1.606 torque multiplication impressed upon the shaft 420 mechanically, an overall torque multiplication through the transmission of $1.606 + 1.97$ or 3.58 results.

In a like manner, several points along the torque ratio curve 1 may be examined and their value analyzed as a sum of the two torque paths. At this point, the advantages of the wide range of speed ratios of $n_t/n_p$, as shown in FIGURE 9, may be emphasized. Since $n_t/n_p$ may reach a value of approximately 3.7, a greater gear reduction may be utilized between the turbine 424 and the shaft 420 so that the overall torque multiplication of the transmission is greatly increased. At the same time, the range of transmission output speeds in which the hydraulic torque convertor 423 contributes a torque multiplication to the transmission output shaft 420 will be greatly increased. The full significance of these facts will appear when the instant transmission is compared with the prior art at a later point in this description.

Returning now to FIGURE 10, curve 2 is plotted to show the ratio of input r.p.m. to maximum input r.p.m. The scale for this curve is at the upper right side of FIGURE 10 and is labeled $n_{in}/n_{in}$ max. This curve is, in effect, the engine r.p.m. as a ratio of maximum engine r.p.m. for the various driving conditions. From curve 2, it may be noted that at a starting condition, with $n_{out}/n_{in}$ max$=0$, the engine r.p.m. is approximately 64% of the maximum engine r.p.m. As the vehicle accelerates, $n_{out}/n_{in}$ max increases from zero, and the engine r.p.m. also increases. The transmission is designed so that the engine r.p.m. reaches its maximum value at the point where the hydraulic torque convertor 423 of the transmission under maximum acceleration becomes inoperative by the actuation of the brake 460 of FIGURE 6. When brake 460 is actuated, the sun gear 418 of the differential gear set 413 is rigidly secured to the housing of the torque convertor 423 so that there is a direct mechanical drive between the ring gear 412 and the planetary carrier 416 which is rigidly secured to the output shaft 420. A reference to the torque ratio curve 1 of FIGURE 10 will show that when the brake 460 is actuated at $n_{out}/n_{in}$ max$=.417$, the direct mechanical drive reflects a constant torque multiplication of 1.606 from $n_{out}/n_{in}$ max$=.417$ to $n_{out}/n_{in}$ max$=.623$. This 1.606 torque multiplication is due to the gear ratios between the ring 412 and carrier 416 of the planetary gear set. The .623 value of $n_{out}/n_{in\ max}$ reflects the maximum ratio of $n_{out}/n_{in\ max}$ for the sample transmission under discussion since the ratio is determined by the gear ratio of the ring gear 412 to the carrier 416 of the planetary gear set 413.

Returning now to curve 2 of FIGURE 10, the maximum engine r.p.m. is reached at the braking point which, for the sample transmission under maximum acceleration, occurs when $n_{out}/n_{in\ max}=.417$. When the brake 460 is actuated, the engine r.p.m. adjusts to the output speed of the transmission and drops correspondingly. As $n_{out}/n_{in\ max}$ increases, then the engine r.p.m. increases since there is a fixed mechanical gear ratio between the engine r.p.m. and the transmission output r.p.m. once the brake 460 is actuated and the sun gear 418 is held from rotation. The particular construction of the instant torque convertor 423 allows the engine r.p.m. to reach a higher percentage of maximum engine r.p.m. than would normally be the case in a combination of a conventional torque convertor with a differential gear set to form a power-shunt transmission. The pump unit of the hydraulic torque convertor controls the maximum engine r.p.m. that may be accepted by the transmission.

To explain this situation, we might consider the transmission stalled condition or $n_{out}/n_{in\ max}=0$. The carrier 416 of the planetary gear set is stationary and the pump 422, fixed to the sun gear 418, rotates at a fixed speed ratio to the engine r.p.m. The engine speed may increase only to the extent that the pump 422 may rotate in the hydraulic torque convertor 423. The maximum engine speed is, therefore, limited by the speed of the pump 422 of the torque convertor 423. Considering now the curves 3 and 6 of FIGURE 9, it may readily be seen that to maintain a constant pump r.p.m., the pump of the instant torque convertor 423 requires much less torque than that of a conventional torque convertor with $n_t/n_p=0$. If we consider equal input torques to be impressed upon the pumps of both convertors, then the torque exerted on the pump 422 of the instant convertor 423 will cause it to attain a higher angular velocity than that of the conventional torque convertor. Looking at it from a slightly different angle, if equal torques are impressed upon the convertor pumps of both a conventional convertor and the instant convertor, the "residual whirl" from the turbine 424 which enters the pump of the instant convertor 423 will cause the pump to attain a higher angular velocity than the pump of the conventional convertor which has little or no residual whirl. This ability of the pump 422 of the instant convertor 423 to attain a higher angular velocity in the turbine stalled condition, and somewhat higher velocities for all turbine to pump speed ratios—$n_t/n_p$ of less than 1—than the pump of the conventional convertor can attain, allows the instant transmission to accept a higher engine r.p.m., and so more power, in the very low speed ranges of $n_{out}/n_{in\ max}$ of the transmission. This feature will also be developed more fully in comparison with the prior art later in this discussion.

Curve 3 of FIGURE 10 shows the ratio of input power which is transferred to the convertor pump 422 to the total power input to the transmission or $P/P$. This value varies in accordance with the equation $$\frac{P_p}{P_{in}}=1-1.606\frac{n_{out}}{n_{in}}$$

as given earlier in this discussion. Since the basic coordinate of FIGURE 10 is $n_{out}/n_{in\ (max)}$ rather than $n_{out}/n_{in}$, the relationship between $P_p/P_{in}$ does not appear as a straight line, as might be expected. As discussed earlier, when the transmission is stalled and $n_{out}/n_{in\ max}=0$, $P_p/P_{in}=1$ since the total input power goes to the hydraulic torque convertor 423 where it is dissipated in heat. As the output shaft 420 begins to turn, the power input to the transmission is distributed in accordance with curve 3 of FIGURE 10; the value shown in curve 3 for each value of $n_{out}/n_{in\ max}$ being the percentage of the total input power directed to the pump of the hydraulic torque convertor 423 and the remainder being the percentage of power that is directed to the mechanical output of the transmission by the planetary gear set 413. As will be noted from curve 3, when the braking point of $n_{out}/n_{in\ max}=.417$ is reached, approximately .33 of the input power is being transmitted by the hydraulic torque convertor 423 and .67 of the input power is being transmitted mechanically. When the brake 460 is applied, power ceases to be transmitted through the hydraulic torque convertor 423 and the value of $P_p/P_{in}$ drops to zero at $n_{out}/n_{in\ (max)}=.417$.

Curve 4 of FIGURE 10 shows the overall efficiency of the sample transmission of FIGURE 6. This efficiency curve reflects the efficiency of the torque convertor in the transmission but assumes a mechanical efficiency of 100% for the planetary gearing. As also discussed above, the efficiency of the overall transmission is zero at $n_{out}/n_{in\ (max)}=0$ since no power is output from the transmission in this condition. The remaining points on the efficiency curve 4 of FIGURE 10 result from the efficiency of the convertor 423 and the percentage of input power that is directed to each path of the transmission. Thus, for example, at $n_{out}/n_{in\ (max)}=.172$ from curve 3 of FIGURE 10, .61 of the input power is transmitted through the hydraulic torque convertor 423 and .39 is directly transmitted mechanically to the output shaft. At a $n_{out}/n_{in\ (max)}$ of .172, the speed of the turbine 424 to the speed of the pump 422 $n_t/n_p$ is 1.0. Referring to curve 2 of FIGURE 9, the efficiency of the torque convertor 423 at $n_t/n_p=1$ is 78%. Since .61 of the input power is transferred through the hydraulic convertor 423 with an efficiency of 78% and .39 of input power is transferred directly mechanically to the output shaft 420 with an assumed efficiency of 100%, the overall efficiency of the transmission at $n_{out}/n_{in\ max}$ is $.39 \times 100\% + .61 \times 78\%$ or 87%, as is reflected by curve 4 of FIGURE 10. It will be noted that the efficiency of the instant transmission becomes high in the relatively low ranges of $n_{out}/n_{in\ max}$ and remains at a relatively high value throughout the range of speeds that the torque convertor 423 contributes torque to the output shaft 420. This is an important feature when considered in the light of the smaller engine which may be used with this transmission and the lower fuel consumption due to the high transmission efficiency.

To further advance the understanding of the overall operation of the transmission, we have included curve 5 of FIGURE 10 which shows the ratio of the pump speed to maximum input speed of the transmission $n_p/n_{in\ (max)}$ plotted against the basic coordinate of FIGURE 10 $n_{in}/n_{out\ max}$. From this curve, it may be seen that the input speed $n_{in}$ is .64 of the maximum input speed $n_{in\ max}$ (Curve 2) at $n_{out}/n_{in\ max}=0$ and the pump speed is 1.044 of the maximum input speed which shows the high speed rotation of the pump 422. This high speed rotation of the pump 422 enables the input speed $n_{in}$ to attain the high value of .64 of the maximum input speed, or maximum engine speed, when the transmission is stalled. As has been discussed, this is a much higher engine input speed than a conventional torque convertor will accept if the conventional convertor is placed behind a differential gear set.

Referring now to FIGURES 6, 9 and 10, we should like to follow through the operation of the instant transmission utilized in a motor vehicle from a condition of rest to a condition of maximum vehicle speed. The transmission has the gear ratios utilized by way of example, throughout this discussion and for which the curves of FIGURE 10 have been drawn. With the vehicle at rest, the accelerator is depressed for a maximum acceleration. The engine will accelerate until it reaches .64 of its maximum speed (FIGURE 10 [2]), at which time the pump 422 will turn at its maximum speed and will limit the engine r.p.m. to .64 of maximum r.p.m. At this point, the pump 422 will be turning at 1.044 of the maximum input (engine) speed (FIGURE 10 [5]) and 1.65 of the actual input (engine) speed. The output shaft 420 will be stalled and so $n_{out}/n_{in\ max}$ will be zero. The turbine 424 will be stalled and so $n_t/n_p$ (FIGURE 9) will be zero. The torque multiplication through the transmission will be at a maximum of 7.80 (FIGURE 10 [1]), as has been discussed. The efficiency of the overall transmission will be zero (FIGURE 10 [4]).

As the vehicle begins to move, the engine speed may be increased (FIGURE 10 [2]) since power is transmitted through both branches of the transmission. The pump speed will begin to drop (FIGURE 10 [5]) and the overall torque multiplication through the transmission (FIGURE 10 [1]) will begin to drop. The output shaft 420 (FIGURE 6) will begin to accelerate under the influence of the turbine 424 of the torque convertor 423 and the direct mechanical output. The turbine speed will increase and as the relative speeds of the differential gear parts change, the percentage of total power passing through the hydraulic torque convertor 423 (FIGURE 10 [3]) will drop. This process will continue as the vehicle speed increases.

With the turbine 424 and pump 422 operating at the same speeds in opposite directions, the ratio $n_{out}/n_{in\ max}$ will be .172. At that point, the overall torque multiplication will be 3.58 (FIGURE 10 [1]) and the engine speed will be .71 of maximum (FIGURE 10 [2]). The pump speed will have dropped so that it is .717 of maximum input r.p.m. (FIGURE 10 [5]) and practically equal to the actual input speed. The amount of power through the hydraulic torque converter 423 (FIGURE 10 [3]) will have dropped to .61 of total input power with a corresponding .39 of the total being directly transmitted mechanically. The overall efficiency of the transmission will have risen to 87% (FIGURE 10 [4]) as has been discussed earlier.

Under maximum acceleration, the pump brake 460 (FIGURE 6) will be actuated when $n_{out}/n_{in\ max}$ is .417. Immediately before the pump brake 460 is actuated, the engine has reached its maximum r.p.m. (FIGURE 10 [2]). The pump speed has dropped until the ratio of pump speed to maximum input speed has dropped to .543 (FIGURE 10 [5]) and the pump 422 is also rotating at .543 of the actual input speed since the input speed and maximum input speed are the same for this point (FIGURE 10 [2]). The torque multiplication through the transmission has dropped to 1.886 (FIGURE 10 [1]). The percentage of power through the hydraulic convertor 423 (FIGURE 10 [3]) has dropped approximately .33 of the total input power with a corresponding .67 of the input power being conveyed through the mechanical gearing. Since the hydraulic torque convertor 423 is now in a less efficient speed range, the total overall efficiency of the transmission has dropped slightly (FIGURE 10 [4]) to a value of 79%.

The pump brake 460 is engaged at a signal from the transmission governor 463 (FIGURE 6). At this time, it will suffice to say that the governor 463 consists of a fly-ball element 470, a spring 471 and a shuttle valve element 472, interposed between the two. The spring 471 is connected to the accelerator of the motor vehicle so that as the accelerator is depressed, the spring tension of spring 471 is increased. As the speed of shaft 430 increases, the balls 470 of the centrifugal fly-ball element move outwardly, forcing the shuttle valve 472 axially against the tension of spring 471. When this action occurs, ports are uncovered by the shuttle valve 472 to conduct hydraulic fluid under pressure from pump 438 to the annular chamber 462 behind pump brake 460. From this brief description, it may be seen that the exact point at which the pump brake 460 is applied depends upon the throttle position, since the tension of spring 471 must be overcome before the brake actuation can occur. Thus, the $n_{out}/n_{in\ max}$ value of .417 for the brake application is for a maximum acceleration when the tension on spring 471 is at a maximum. When there is a less rapid acceleration, the pump brake 460 will be applied earlier, or at a lesser value of $n_{out}/n_{in\ max}$ since the tension of spring 471 will be less.

Once the brake 460 is applied, the pump 422 becomes fixed with respect to the casing and there is a direct mechanical drive through the transmission. The curves of FIGURE 10 reflect this situation. The torque multiplication (FIGURE 10 [1]) becomes a fixed ratio of the mechanical gearing which is a 1.606 torque multiplication for the particular gear ratios under consideration. The efficiency of the transmission (FIGURE 10 [4]) becomes the mechanical efficiency which has been assumed at 100%. Since the pump has stopped, the percentage of power transferred through the hydraulic torque convertor (FIGURE 10 [3]) drops to zero. The ratio of pump speed to maximum input speed (FIGURE 10 [5]) also drops to zero. The engine speed (FIGURE 10 [2]) adjusts itself to the direct mechanical drive and continues to increase linearly as the ratio $n_{out}/n_{in\ max}$ increases there is a fixed gear ratio between the engine shaft and the transmission output shaft 420 when the pump 422 is stopped.

When the pump 422 is stopped, the function of the one-way clutch 428 becomes apparent. With the hydraulic convertor 423 locked out, it is undesirable to allow the turbine 424 to continue to rotate at a fixed gear ratio to the output shaft 420 since this will create a drag upon the output shaft 420 and cause loss of power by causing the turbine 424 to rotate within the closed circuit toroid of the convertor 423. To eliminate this possibility, the one-way clutch 428 has been installed so that the turbine 424 can drive the output shaft 420 at all times but so that the output shaft 420 cannot drive the turbine 424.

FIGURE 6 also shows a reversing mechanism which we have purposely omitted mentioning in detail until now. This mechanism consists mainly of a clutch 436 which is splined to shaft 435. When the clutch 436 is shifted to the left, it engages the clutch teeth on gear 433 and there is a forward drive through the transmission as has been described up to this point. When the clutch 436 is shifted to the right, it is disconnected from gear 433 and connected to gear 434 which is journalled on shaft 435 but is not normally fixed to it. Thus, a reverse drive for the transmission is created. The operation of this reverse drive is as follows:

The convertor 423 and the output shaft 420 function as has been described. The sum of their outputs is then impressed upon shaft 430 which is connected to shaft 435 through gear 432, an idler gear (not shown but which is behind gears 432 and 434) gear 434 and clutch member 436. Thus, it will be seen that the gear ratios between the turbine 424 and the output shaft 420, and the gear ratios through which shaft 420 drives shaft 435, are different in reverse than in the forward direction.

One other feature of the transmission is the clutch 475 which allows the transmission to provide a vehicle braking action. The clutch 475 is splined at 476 to shaft 430 and is normally disengaged from the clutch teeth 477 on gear 427 as shown in FIGURE 6. If this clutch 475 is engaged with teeth 477 on gear 427, however, the turbine 424 is rigidly connected with output shaft 420 so that shaft 420 may drive it. Thus, when the vehicle is driven down a steep grade and a vehicle braking effect is desired, clutch 475 may be mechanically engaged to allow shaft 420 to drive the turbine 424 within the toroidal flow circuit and create a drag effect on the shaft 420.

The operation of the transmissions shown in FIGURES 1, 4 and 5 is essentially the same as that completely described for FIGURE 6. The various configurations of FIGURES 1, 4 and 5 simply show various arrangements for the planetary power and torque splitting differential gear. FIGURE 1, for example, shows a planetary gear with the input to the planetary carrier, the convertor pump integral with the sun gear, and the mechanical output impressed upon the ring gear. FIGURE 4, on the other hand, shows the configuration which most closely resembles the transmission of FIGURE 6 which has been fully described above. It will be noted that there is a planetary reduction gear between the turbine and the output shaft in embodiment of FIGURES 1, 4 and 5. However, its function is identical to the gear reduction shown in the FIGURE 6 transmission.

Completing our discussion of the FIGURE 6 transmission, we should consider some of the more pertinent prior art and point up the distinctions and advantages of the present transmission over the cited art. To accomplish this, we should like to generally point out the areas in which the transmission of the instant invention excells and then show how the prior art stands in these areas. The graphs of FIGURES 11 and 12, have been drawn to compare the overall transmission characteristics of the present invention as represented by FIGURE 10 with characteristics of typical power-shunt transmissions. To draw the curves of the typical power-shunt transmission, two conditions were considered. One condition was to get a torque multiplication at the transmission stalled condition very nearly equal to that of the present transmission. The characteristics of a typical power-shunt transmission that achieves this condition are shown superimposed in dash lines upon the characteristics of the instant transmission in FIGURE 11.

A second condition for the comparison was to get a typical power-shunt transmission on which the hydraulic torque convertor contributes torque multiplication to the output of the transmission over approximately two-thirds of the total speed range of the transmission as the transmission of the instant invention does. A reference to curve 1 of FIGURE 10 will show that the convertor contributes torque multiplication to the instant transmission up to a ratio of $n_{out}/n_{in\ max}$ of .417. The total speed range of the transmission is $n_{out}/n_{in\ max}=.623$. Therefore, over approximately two-thirds of the speed range, the convertor contributes torque multiplication to the transmission output.

Figure 11:
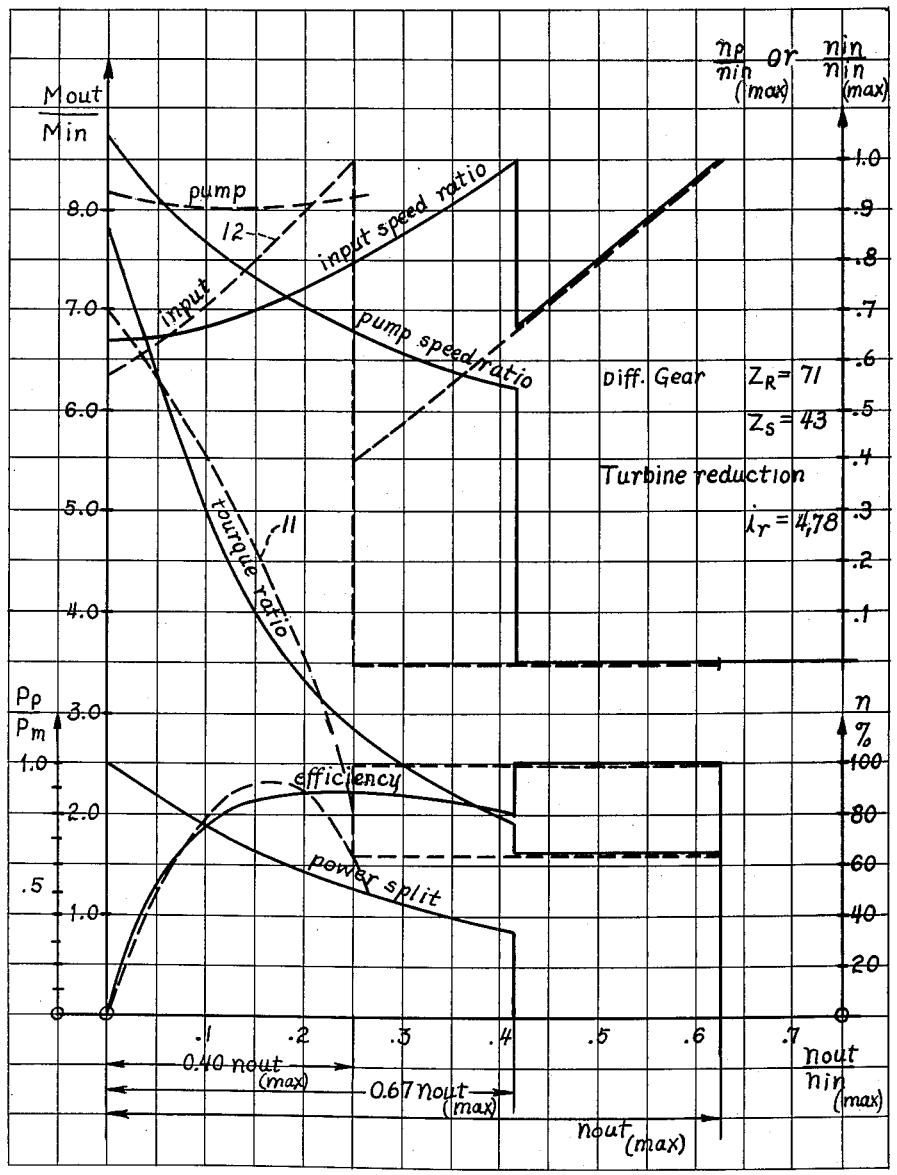
FIGURES 11 and 12 are plots of the characteristics of the transmission of FIGURE 6 in comparison with the most efficient known prior power-shunt transmissions.

To arrive at the curves for the typical transmission of FIGURE 11, the characteristics of a standard torque convertor, as shown in curves 4, 5 and 6 of FIGURE 9 were used as a basis. These curves reflect the characteristics of an outstanding, modern, high speed, single stage, three-element torque convertor. They may be compared with any textbook or technical publication and it will be found that they represent a most efficient torque convertor. Taking this modern, efficient torque convertor, I have shown what characteristics it will provide to a power-shunt transmission with the same differential gear ratios and turbine reduction gear ratio which were used to arrive at the curves of FIGURE 10. Thus, from FIGURE 11, it may be seen that the overall torque multiplication (curve 11) reaches almost the value of the instant transmission when the transmissions are stalled. The values for the torque multiplication were ascertained in the same manner as has been described above in connection with the curves of FIGURE 10. Briefly, the torque split will be the same as for FIGURE 10 since the planetary gear ratios are the same and 1.606 of the input torque will be impressed directly on the output shaft. The .606 of the input torque will be acted upon according to the characteristics of curve 4 of FIGURE 9, and then multiplied by the 4.18 gear ratio between the turbine and the output shaft before it is added to the 1.606 of the input torque impressed directly on the output shaft. From FIGURE 9, it may be seen that the value of torque multiplication (curve 1) becomes zero when the turbine speed to pump speed ratio $n_t/n_p=1.2$. Correlating the ratio $n_t/n_p$ with the corresponding value of $n_{out}/n_{in\ max}$, which is the basic coordinate of FIGURES 10, 11 and 12, it will be seen that the conventional convertor ceases to add torque to the output shaft when $n_{out}/n_{in\ max}$ becomes .27. Thus, the conventional convertor must be braked to a stop slightly before $n_{out}/n_{in\ max}=.27$ or at approximately .25. The convertor then adds torque to the output shaft only over $$\frac{.25}{.623} \text{ or } .40$$

of the total transmission speed range.

The engine speed ratio represented by curve 12 of FIGURE 11 shows the effect of the lack of "residual whirl" on the pump of the conventional torque convertor. Even though the transmission of FIGURE 11 is designed so that the engine r.p.m. reaches a maximum when the convertor brake is applied, the initial input speed to the transmission must necessarily be reduced because the speed of the conventional convertor pump is limited by the characteristic previously shown and discussed in connection with FIGURE 9, curves 2 and 6.

From FIGURE 11, it may also be seen that when the pump brake is engaged, the engine r.p.m. must drop a great deal to accommodate the fixed gear ratio between the input and output shafts of the transmission. The transmission which would result from placing a conventional convertor in the gearing of the transmission of FIGURE 6 would be similar to a standard automobile transmission with a first gear and a third gear but without a second gear.

Figure 12:
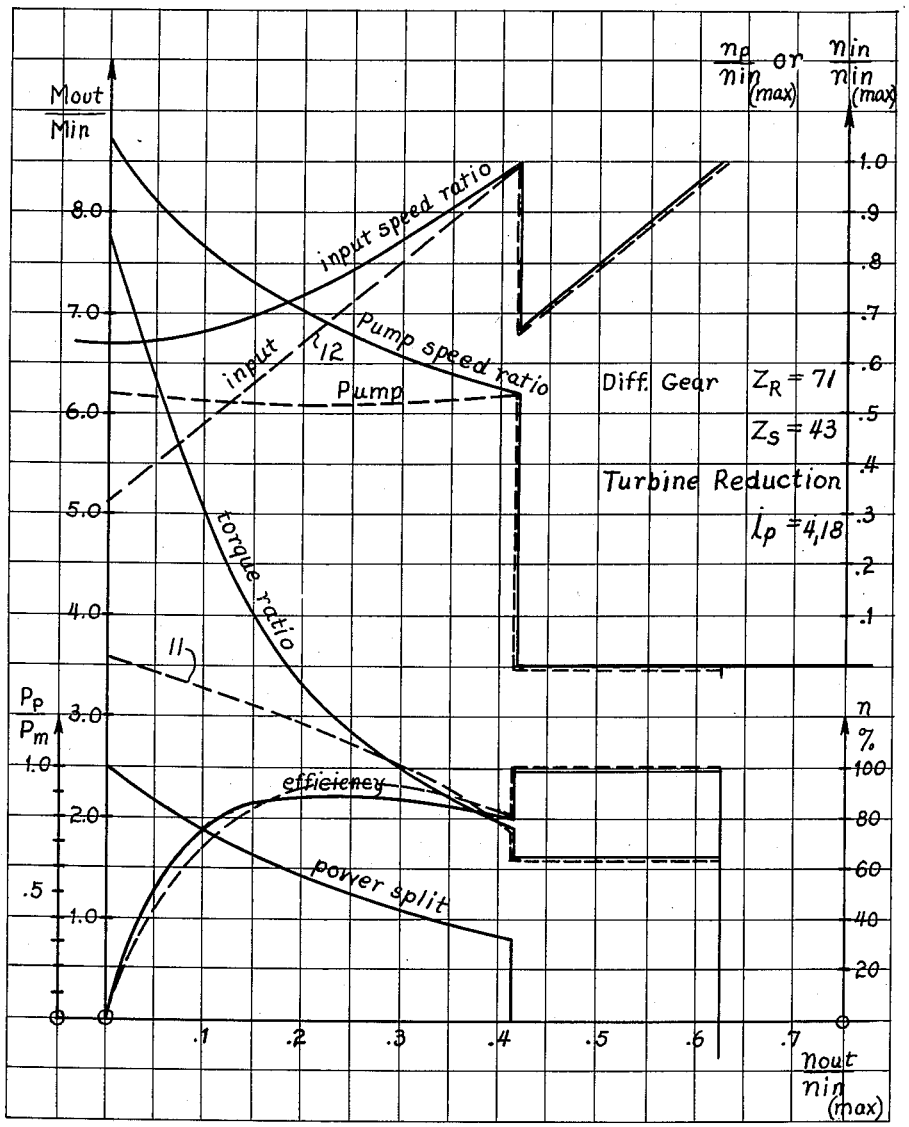

Turning now to FIGURE 12, the result of placing a conventional torque convertor in a power-shunt transmission and arranging the reduction gearing between the convertor turbine and the transmission output so that the convertor will add torque to the output shaft over a range of approximately two-thirds of the overall transmission speed range may be seen. To accomplish the widening of the speed range, the reduction gearing between the turbine and transmission output has been changed to provide a torque multiplication of 1.51 between the turbine and the output shaft. This change enables the turbine of the conventional convertor, running at a much slower speed, to contribute torque to the output shaft over a wider speed range. Since the torque split remains the same (the ratios of the planetary gear are the same), the smaller torque multiplication between the turbine and the pump results in much smaller overall torque ratios over the low-speed ranges of the transmission, as shown in FIGURE 12 (11).

In FIGURE 12, the transmission is also designed to allow the engine r.p.m. to reach the maximum just before the braking point is reached. In this event, the input r.p.m. at the transmission stalled condition must necessarily be very low since it is limited by the maximum pump speed, as governed by the characteristics of FIGURE 9 (6). From a comparison of FIGURES 11 and 12, advantages of the instant invention may be seen. It provides a power-shunt transmission in which a high initial torque multiplication may be achieved and in which, at the same time, the hydraulic torque convertor may contribute torque to the output shaft over approximately two-thirds of the entire transmission speed range. FIGURES 11 and 12 show that the use of a conventional convertor in a power-shunt transmission sacrifices either the high initial torque multiplication to achieve the speed range (FIGURE 12) or sacrifices the speed range to achieve high initial torque multiplication (FIGURE 11).

*Fifth Embodiment (FIGURES 13 and 14)*

Figures 13, 14:
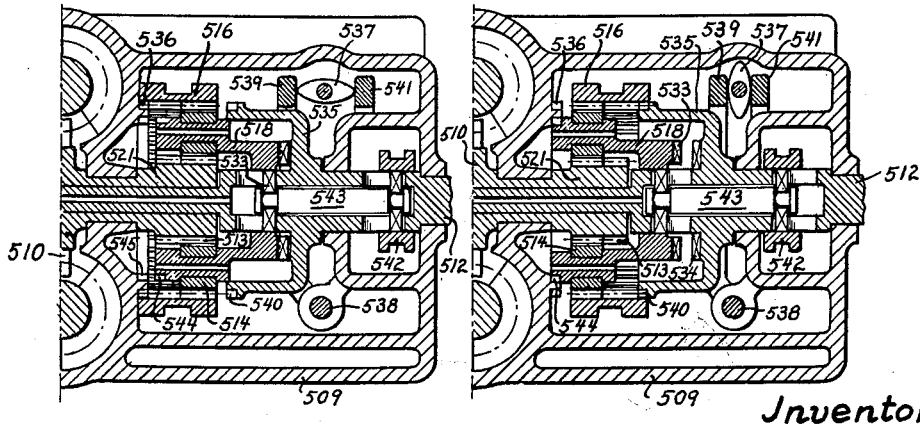
FIGURE 13 is a sectional view of a fifth embodiment of the invention utilizing an axial flow turbine equipped torque convertor and showing an additional reversing gear mechanism engaged.
FIGURE 14 shows the embodiment of FIGURE 13 with said reversing gear mechanism disengaged.

FIGURES 13 and 14 show modified gearing arrangement for the transmissions of FIGURES 1, 4 and 5 for so reversing the planetary gear between turbine shaft 521 and driven shaft 512 that the direction of rotation of the driven shaft may be changed to a certain degree. FIGURE 13 shows the planetary gear in normal operation, whereas FIGURE 14 shows the reversion to backward motion. When the gear mechanism (FIGURE 13) is running ahead, the planet carrier 518 capable of moving in axial direction is coupled to the driven shaft 512 by means of front jaw clutch teeth 533 engaging complementary jaw clutch teeth 534 of the flange 535 of the driven shaft 512, and the outer wheel or ring gear 516, being also capable of shifting axially, engages jaw brake teeth 536 rigidly fastened to the housing 509. This means that the torque of turbine wheel 510 is transmitted to the planet carrier 518 by means of the turbine shaft 521 carrying the axially elongated inner wheel or sun gear 513 of the planetary gear and by means of the planet pinions 514, said planet carrier 518 in turn being connected to the driven shaft through the teeth 534.

To impart reverse movement to the driven shaft 512, the ring gear 516 and the planet carrier 518 are moved in opposite axial directions. To this end, as suggested in FIGURES 13 and 14, a double cam 537 is adjustable by means of a lever—not shown. This double cam 537 operates a lever 539 pivotally mounted on a shaft 538 and connected with the ring gear wheel 516 which is constructed as a sleeve or collar. When the lever 539 is swung to the right as shown in FIGURE 14, the ring gear 516 is moved in the same direction, whereby its teeth are disengaged from the brake teeth 536 on the housing 509, and is thereby engaged with the clutch teeth 540 of the flange 535 (FIGURE 14). Moreover, the double cam 537 operates another lever 541 which is also pivotally mounted on the shaft 538 and which operates a sleeve 542 guided on the driven shaft 512, which sleeve 542 moves the planet carrier 518 to the left side by means of a sliding bolt 543 guided in the interior of the driven shaft 512, so that the planet carrier 518 with its brake teeth 544 is brought into engagement with the brake teeth 545 of the housing 509. With reverse motion, therefore, the planet carrier 518 comes to a stop so that the ring gear 516 connected to the driven shaft 512 rotates in an opposite direction with respect to the turbine shaft 521. This is achieved by the fact that the torque coming from the turbine wheel 510 is greater than that imparted by the differential gear mechanism through the driven shaft 512.

*Power-Shunt Transmissions Embodying Radial Flow Reaction Turbine Equipped Torque Convertors (Embodiments 6, 7 and 8)*

The following description in reference to FIGURES 15 to 30 inclusive illustrates the application of the principles of the present invention to radial flow turbine equipped torque convertors for power-shunt transmissions and illustrates a further improvement, which is equally applicable to either axial or radial flow reaction turbine equipped torque convertors, in the provision of a stator or reaction member a portion of which can be automatically rendered ineffective for a predetermined portion of the transmission operating range to produce more efficient torque convertor and overall transmission operation.

According to these embodiments of the present invention, the turbine wheel or rotor is a radial flow reaction turbine the blades of which are greatly curved backwardly, as shown in FIGURE 21 and is arranged within the impeller or pump and the fluid passes therethrough in radial direction from the inside toward the outside so that during the starting period of the vehicle, the energy produced by the impeller is as far as possible completely converted into the circumferential velocity of the fluid driving means, while the direction of the circumferential velocity of the fluid driving means is the same as the direction of the circumferential velocity of the impeller. In this way, especially during the starting period of the vehicle, the losses are considerably reduced and the torque conversion is considerably increased over the heretofore employed infinitely variable transmission.

In order further to enlarge the range of a satisfactory degree of efficiency of such transmission, and in order also at low speeds to obtain a high degree of efficiency, in conformity with the invention a portion of the reaction member is provided in the fluid circuit which portion of the reaction member may selectively be made effective or ineffective. The so controllable reaction member portion may be controlled automatically by the oil pressure in the fluid circuit so that a control of this reaction member portion by the operator is not necessary.

The materialization of this aspect of the present invention may be effected in various manners. Thus, for instance, the controllable reaction member portion may be passed through in axial direction by the fluid and may be arranged within the innermost part of the fluid circuit while it may selectively be made effective or ineffective by a hydraulically actuated clamping ring or the like. The controllable reaction member portion, however, may also be passed through by the fluid in radial direction and may be axially displaceable by means of an annular piston or the like between operative and inoperative positions. In this latter instance it is possible to arrange the control of the controllable reaction member portion in the core of the fluid transmission circuit and to arrange the controllable reaction member portion so that it can be moved into the core. Such an arrangement makes possible a very compact construction of the torque convertor.

In addition to the reaction blades of the turbine wheel, advantageously also the blades of the impeller are curved backwardly so that when impeller and turbine are running in opposite directions, a high degree of efficiency will be obtained.

Naturally, a motor vehicle transmission also requires a backward drive. In order to couple the same in a most simple manner with the transmission according to the invention, the output shaft may be interrupted between the power divider transmission and the splined shaft of the sliding gear of a two-step spur gear transmission, and there may be provided a jaw clutch for the forward travel, and a gear with locking pawl for the rearward travel.

In order as far as possible to reduce leakage losses of the fluid drive through the bearings of the impeller and turbine, annular chambers may be provided in or between the bearings of the turbine and the impeller, and these chambers may be connected through bores in the shafts and the like with the fluid circuit in order to return the leaked-out oil to the fluid circuit.

*Sixth Embodiment (Figures 15, 16–23, and 25–27)*

Referring now to the drawings in detail and particularly to FIGURE 15, the differential transmission shown therein is designed as planetary gear transmission. The power furnished by the motor (not shown in the drawing) is through the intervention of the driving shaft 601 conveyed to the internal ring gear 605 carrying inner teeth or a gear ring 605a. The planet pinion carrier 602 has thereon a plurality of equiangularly spaced bolts or stub shafts 603 rotatably supporting the planet pinions 604. These planet pinions 604 simultaneously mesh with the gear ring 605a and the sun gear 606 provided with external teeth. The sun gear 606 is connected to the impeller or pump 608 by means of a shaft 607. This impeller 608 is rotatably journalled in the casing 609. In addition thereto, also rotatably journalled in the casing 609 is a turbine wheel or rotor 610. This turbine wheel 610 is connected with a gear 613 through the intervention of a hollow shaft 611, said gear 613 being arranged to mesh with a gear 613' on a counter shaft 613" for transmitting power therethrough.

Within the fluid channel or circuit 614 of the casing 609 there is provided a stationary reaction member portion 615. In addition to this reaction member portion 615, according to the present invention there is provided a second reaction member portion 616 arranged within the fluid channel 614. Said second reaction member portion 616 is mounted on a shaft 617 which, when not acted upon, is adapted to rotate freely. When the shaft 617 rotates freely, the second reaction member portion 616 will have no effect so that at low speeds of the output shaft 629 during the starting movement of the vehicle, the losses of the transmission will be reduced.

According to the invention, it is, however, also possible to arrest said reaction member portion 616 for instance by means of a clamping ring 618 which surrounds the shaft 611, said clamping ring being adapted to be displaced by means of a plurality of pistons 619 against the thrust of pressure springs 619a.

At low speed of the pump 608, i.e. when the throttle is partially or fully opened while the vehicle drives at high speed, the ring 618 is pressed by said springs 619a against the shaft 617 whereby the reaction member portion 616 is arrested and the fluid circuit is affected correspondingly. At higher pressure within the fluid circuit 614, this pressure is conveyed through a channel 620 to the pistons 619 whereby the ring 618 is withdrawn from the shaft 617. The shaft is then able to move freely with the reaction member portion 616 so that the fluid circuit is not any longer influenced by said reaction member portion 616.

FIGURES 21, 22 and 23 illustrate the blading of the arrangement according to FIGURE 15. As will be evident from FIGURE 21, the blades of pump 608 are curved backwardly. Similarly, the reaction blades of the turbine 610 have a strong curvature toward the rear. FIGURE 22 illustrates the blading of the second reaction member portion 616, whereas FIGURE 23 shows the blading of the stationary reaction member portion 615. With this blading, the corresponding speeds in the fluid circuit are illustrated by vectors. Furthermore, the letter subscripts P stand for pump, T for turbine and L for reaction member, whereas the subscripts "1" designate the entrance speed and "2" the exit speed.

FIGURES 18 to 20 show the velocity triangles or vector diagrams when the reaction member portion 616 is ineffective, for instance when starting the movement of the vehicle. The velocity diagrams in FIGURES 25 to 27 show the arrangement while driving at high speed, i.e. with reaction member portion 616 stationary and operatively effective upon the fluid in circuit 614.

The pump 608 driven through the divider transmission produces an oil circulation in the fluid circuit 614. The fluid passes in radial direction through the turbine wheel 610, the fluid driving means (oil, air or the like) flowing radially from the inside toward the outside. The reaction turbine wheel 610 is arranged radially within the pump 608 in such a manner that only a small distance prevails between the outer diameter of the turbine wheel 610 and the inner or entrance diameter of the pump 608. This measure primarily serves to reduce the losses because the highest possible absolute velocities occur in the space between turbine 610 and pump 608 as will be obvious from the velocity triangles according to FIGURES 18 to 20.

The return blades of the reaction member portion 615 are in conformity with FIGURE 23 only slightly curved. Inasmuch as when starting the vehicle, the highest pressure prevails in the fluid circuit, the reaction member portion 616 is ineffective. The flow losses in the return blades are therefore very small. However, also in the turbine wheel 610 favorable conditions as to the afflux and deflux prevail whereby the starting moment can be considerably increased.

When driving at maximum speed or with fully throttled motor, the turbine 610 will still have a good degree of efficiency while the turbine wheel rotates at as high a speed as possible. This object is materialized by the stopping of the reaction member portion 616 inasmuch as the reaction member portion 616 produces a uniform flow $C_{T1}$ ahead of the turbine 610 as is clearly visible from FIGURE 26.

The displacement of the ring 618 is effected automatically by means of the described actuation of the pistons 619.

*Seventh Embodiment (FIGURE 16)*

The arrangement of the controllable or second reaction member portion within the fluid circuit may in conformity with FIGURE 16 also be obtained in a different way. According to FIGURE 16, there is also provided a pump 708 within which the turbine wheel 710 is arranged. In contrast to FIGURE 15, however, the second reaction member portion 721 is not arranged at the narrowest cross section of the fluid circuit 714 but is arranged within a part of the fluid circuit through which the fluid passes in radial direction. This reaction member portion 721 may likewise be adjusted by an annular piston 722 through the intervention of a valve 723 which in its turn is controlled by a piston 724. When the pressure behind the pump 708 is high enough to overcome the thrust of a spring 727 urging valve 723 into closing position, the valve 723 by means of piston 724 is opened, and the pressure means can flow out of the cylinder space 725 through channel 742 into the annular space 741 between the turbine wheel 710 and the pump 708 inasmuch as here a lower pressure prevails. Due to the low pressure in cylinder chamber 725 and the higher pressure in the fluid circuit, the reaction member portion 721 is moved out of the fluid circuit so that it becomes non-effective. The annular piston 722 is by means of the pressure springs 726 so influenced that the guiding blades of the reaction member portion 721 in the fluid circuit become effective. The piston 724 of the valve 723 is, as stated above, under the load of pressure spring 727 the thrust of which may be varied by a set screw 728. This spring 727 closes the valve 723 when the pressure in the fluid drops below a certain value, i.e. when the driving speed at the position of the throttle fully open has reached about 70 to 80% of the maximum speed or when the motor is throttled.

This arrangement makes the displacement of the reaction member portion 721 dependent in a very simple manner upon the motor speed and also on the accelerator position. In other words, with the throttle fully open, the reaction member portion 721 is made effective only at a considerably higher motor speed than is the case when the throttle is only half open, because the speed of the pump 708 and thus the control pressure is dependent on the motor speed as well as the ratio of the speed of the driving shaft 701 with regard to the speed of the output shaft 729.

The additional arrangement of the controllable reaction member portion 616 or 721 adapted selectively to be made effective or ineffective, yields the same advantages as are obtained by means of an automatic step changeover without, however, having to contend with the drawbacks of the automatic step change namely the complicated automatic, the couplings and brakes sensitive to wear, and the shifting of the entire power conveying parts.

FIGURE 24 shows the arrangement of the blades of the stationary reaction member portion 715 and the adjustable reaction member portion 721 according to FIGURE 16.

With reference to the embodiments of both FIGURES 15 and 16, the output shafts 629 (729) are interrupted between the planet carrier 602 (702) and a splined shaft 630 (730). When the vehicle drives forwardly, these parts are interconnected by a jaw clutch 632 (732) between the sliding gears 631 (731) and a gear 635 (735) so that the output of the planet carrier 602 (702) and the output of the turbine 610 (710) are added to each other. When shifting for rearward drive, the sliding gear 631 (731) is moved toward the right so that through the intervention of a gear 643 (743) it will mesh with a gear 633 (733) of an intermediate shaft 634 (734). During this rearward drive, the planet carrier 602 (702) is arrested by means of the gear 635 (735) (FIGURE 17) and locking pawl 636, in other words the two parts of the output shaft are separated from each other and the turbine acts upon the output in the reverse direction of rotation through the intermediate shaft 634 (734). In this way an additional reversing gear is saved, thereby considerably simplifying the entire construction.

As thus appears in these embodiments, the mechanical portion of the parallel power paths is broken and the output shaft 629 (729) is driven only through the hydraulic torque convertor in reverse. Further, the gear ratio between the convertor turbine 610 (710) and the output shaft 629 (729) is changed so that there is greater torque multiplication than when in the forward position. This design, it will be realized, is equally applicable to transmissions embodying axial flow reaction turbine equipped torque convertors.

The interruption of the output shaft results in a considerable increase in the torque during the rearward drive. The parking position at which the output shaft is not rotatable is obtained when the sliding gear 631 (731) occupies its forward position and the pawl 636 engages the gear 635 which positions are obtained by adjusting a corresponding shift lever (not shown).

In order to avoid losses due to leakage, corresponding measures are taken. The leakage losses through the bearings within the fluid circuit become all the greater the faster the impeller 608 (708) rotates. At maximum speed of rotation of the impeller 608 (708), however, the drive shaft rotates only at ⅔ of maximum motor speed. Inversely, at maximum motor speed the impeller 608 (708) rotates at a half of the maximum motor speed only.

The supply of fluid to the fluid circuit is effected by means of a gear pump 637 (737) which rotates together with the drive shaft 601 (701). This gear pump is so dimensioned that at each condition of operation, more oil can be delivered than will escape from the fluid circuit. The gear pump can be dimensioned very small, and its driving power can be accordingly low, because the leakage oil from the fluid circuit is returned to the fluid circuit through bores 638 (738) of the shaft 607 (707) or through bores 639 (739) of the turbine shaft 611 (711). Radial blades 640 (740) arranged in the impeller 608 (708) may be employed for purposes of venting or separating the air as in the previous embodiments. The operating characteristics of the torque convertor are substantially identical to those of the eighth embodiment which will be described in detail presently.

*Eighth Embodiment (FIGURES 28 to 30)*

FIGURE 28 shows a preferred form of radial flow reaction turbine equipped torque convertor which is structurally and operationally very similar to the torque convertor of the power-shunt transmission shown in FIGURE 16.

FIGURE 29 at the top shows blade profiles of the axial fixed guide vanes 815, the pump 808, the turbine 810 and of the retractible radial guide vanes 821 and beneath each the corresponding velocity diagrams throughout of the torque convertor flow circuit. This figure corresponds to and gives the same type of information the radial flow reaction turbine equipped torque convertor as FIGURE 8 gives for the axial flow reaction turbine equipped torque convertor. FIGURE 30 shows characteristic curves of the radial flow reaction turbine equipped torque convertor per se, and corresponds to FIGURE 9 of the earlier description of the axial flow reaction turbine equipped torque convertor.

The only difference between the FIGURE 16 convertor and that of FIGURE 28 is that the guide vane 715 of FIGURE 16 is a radial guide vane while the corresponding member 815 of FIGURE 28 is axial. This difference does not affect the mode of operation of the convertor but simply makes the convertor of FIGURE 28 slightly more efficient.

As shown in FIGURE 28, the stator 821 may be rendered ineffective by retracting it axially into the core of the toroidal flow chamber 814. The stator 821 is designed to be retracted or inoperable during the low speed range of the transmission and to be extended or operable in the high speed range. In FIGURE 28, the stator 821 is rendered inoperative by the pressures acting within the fluid circuit toroid 814. As has been thoroughly discussed in connection with the axial flow turbine convertor embodiments, when the output shaft of the entire transmission is stalled or moving with a very low angular velocity, the velocity of the pump 808 is at its maximum. Therefore, the pressure at the pump outlet is a maximum. Because of this fact, the spool valve 823 shown in the core of the toroid is forced to the left against the force of spring 827 by fluid pressure entering the orifice 828. When the spool valve 823 is thus forced to the left, it closes passage 829 and allows passages 842 and 824' to communicate with each other.

As has also been discussed in connection with the embodiment of FIGURE 6, the minimum pressure in the fluid circuit 814 occurs at the turbine outlet since there is an increase of fluid velocity through the turbine. Thus, when passages 842 and 824 are put into communication, the annular chamber 825 in which spring 826 is located is put at the minimum fluid pressure of the flow circuit. Thus, the high pressure on the outer annular face of the stator 821 forces it axially inwardly against the force of spring 826 until the stator 821 is completely retracted into the core of the toroid.

As the transmission output shaft increases in speed, the velocity of the pump 808 diminishes. Thus, the pressure in the fluid toroid 814 decreases. When the pressure decreases to a point where it no longer holds spool valve 823 to the left against spring 827, the spool valve 823 moves to the right to the position in which it is shown in FIGURE 28. Then, fluid passage 842 is closed and passages 829 and 824 communicate with each other. The annular chamber 825 in which spring 826 is located then is filled with fluid at approximately the same pressure as the fluid pressure on the outer face of the stator 821. Thus, the spring 826 forces the stator 821 into its extended or effective position as shown in FIGURE 28.

The effect of the extended stator 821 is to redirect the fluid emerging from the stator 815 so that it has an opposite tangential component from that with which it emerged from stator 815. This redirection is valuable at higher turbine speeds as will become more apparent as this discussion proceeds.

In FIGURE 29, fluid velocities for three pump-turbine speed conditions are depicted. The notations used on these velocity diagrams are consistent with those on FIGURE 8 above. The diagrams of FIGURE 29 must be read from right to left, however. Thus, the top horizontal row of diagrams shows the fluid velocities for the turbine stalled condition or the ratio of turbine velocity to pump velocity $$\frac{n_t}{n_p}=0$$

The second horizontal row shows the condition existing when the turbine and pump are at the same angular speed rotating in opposite directions or $$\frac{n_t}{n_p}=1$$

The third horizontal row shows the turbine speed exceeding the pump speed or $$\frac{n_t}{n_p}=2.5$$

The stator 821 does not become effective until $$\frac{n_t}{n_p}$$

is slightly greater than one. Therefore, the top two horizontal rows of velocity diagrams show the conditions with the stator 821 retracted. The velocity diagrams of FIGURE 8 have been completely explained for the condition $$\frac{n_t}{n_p}=0$$

Those explanations are identical for the present diagrams of FIGURE 29. Since the stator 821 is retracted, it has no effect on the fluid. The slight increase in magnitude of the velocity $C_2$ over velocity $C_1$ in the extreme right hand block (1) of the top horizontal row is due only to the fact that the toroidal flow passage 814 becomes slightly restricted as the fluid flows from a greater toroidal radius (at $C_1$) to a lesser toroidal radius (at $C_2$). It will be noted that the "residual whirl" marked 0 is a maximum at this turbine stalled condition of $$\frac{n_t}{n_p}=0$$

In the second horizontal row of diagrams, the turbine speed and the pump speed are equal. Thus, the turbine speed is no longer zero and the "residual whirl" 0 of the fluid leaving the turbine 810 has also decreased as is consistent with the previous description in reference to FIGURE 8. Here, too, the stator 821 is retracted and has no effect upon the fluid circuit.

In the third horizontal row of diagrams, the effect of the extended stator 821 is shown. Viewing the extreme right hand block (9) in the third horizontal row, it may be seen that the fluid enters stator 821 with a tangential component in one direction and is redirected so that it emerges with a tangential component in the opposite direction. Thus, at the high turbine speeds $$\left(\frac{n_t}{n_p}=2.5\right)$$

the fluid enters the turbine with a tangential component that is in the same direction as the circumferential velocity $U_1$ of the turbine. (See block 10).

As discussed above, I have found that a reaction turbine may be designed to run efficiently over a wide range of speeds. In effect, this means that the fluid entering the turbine 810 may enter with a relative velocity $W_1$ which varies to a greater degree than with the impulse turbine. However, the most efficient operation will still occur when the fluid enters the turbine blade with a relative velocity $W_1$ which is nearest a zero angle of attack to the blade profile or, as stated more properly, when the fluid enters tangent to the blade camber line 850. Thus, if the angle of fluid entry may be kept fairly close to a tangent to the blade camber line 850 at its leading edge, more efficient turbine operation will take place.

Referring now to blocks 2, 6 and 10 of FIGURE 29, it may be seen that the relative velocity $W_1$ of the fluid entering the turbine 810 is not greatly deviated from the optimum entry to the turbine blade profile shown directly above the velocity diagrams in any driving ratio of $$\frac{n_t}{n_p}$$

However, if the retractable stator 821 did not redirect the fluid to the turbine 810, the velocity $W_1$ in block 10 would create a large negative angle of attack with the blade profile.

Comparing the velocity diagrams of FIGURE 29 with FIGURE 8, it may be seen that because the stator of FIGURE 8 is fixed, the angle at which the fluid emerges from the stator $L_2$ (FIGURE 6) must be a compromise of the most efficient blade entry angles over the entire range of turbine speeds. For the most part, however, this compromise has resulted in relatively efficient operation. The additional cost of providing the additional stator is, therefore, not justified in most cases.

FIGURE 30 shows the effects of the retractable stator turbine of FIGURE 28. It will be noted that two sets of curves are plotted—one with the stator 821 ($L_2$) retracted and one with it extended. It will be noted that with the stator 821 ($L_2$) extended, the convertor has a maximum turbine to pump torque ratio $$\frac{M_t}{M_p} \text{ of } 2.6$$

and a maximum turbine to pump speed ratio $$\frac{n_t}{n_p} \text{ of } 3.4$$

These values compare favorably with the values of the same quantities in FIGURE 9. When the stator 821 ($L_2$) is retracted, the characteristics of the convertor over the low turbine speed range improves but the ability of the pump to drive the turbine to high speeds decreases. Thus, with the stator 821 retracted, the maximum torque at $$\frac{n_t}{n_p}=0$$

becomes 3.5 but the maximum value that $$\frac{n_t}{n_p}$$

can attain is only 2.7.

It will be apparent that the stator springs 827 and 826 are of such force as to cause the stator 821 to extend when the two sets of curves cross so that the useful curve embodies the more advantageous characteristics of each curve. Further, it is apparent that if a retractable stator were added to the convertor of FIGURE 6, the operating characteristics could be improved correspondingly.

If it is desired, the curves of FIGURE 30 can be utilized to produce an overall transmission characteristic graph such as FIGURE 10. It is not thought, however, that such a graph is necessary to an adequate disclosure of the invention. It will also be seen that the velocity diagrams and blade profiles of FIGURE 29, although drawn in expanded form, are perfectly consistent with FIGURES 18–27.

*General*

Reviewing the whole invention, then, the important features of the torque convertor which make it particularly useful in a power-shunt transmission and restrict its use to a power-shunt transmission are:

(1) High initial torque of the stalled turbine which requires a low pump torque to provide it. This feature allows the input r.p.m. to the transmission to be very high which is necessary if the transmission is to be used with low performance engines or in vehicles with high weight to power ratios such as small European automobiles or large trucks. This same feature makes it impossible to utilize the convertor directly without differential gearing because the converter could allow the engine to overspeed, as evidenced by FIGURE 10(5) where the pump speed is 1.04 of the maximum input speed. In this particular configuration, there is reduction gearing between the engine and the pump at the turbine stalled condition, and still the pump travels at a higher angular velocity than the input shaft. Without reduction gearing, the pump speed could reach approximately twice the angular velocity of the maximum engine speed.

(2) The ability of the turbine to be driven well beyond the speed of the pump to a turbine to pump speed ratio $n_t/n_p > 3$. This feature allows a large torque multiplication to be introduced between the turbine of the torque converter and the output shaft of the transmission without unduly restricting the speed range of the transmission in which the turbine contributes torque to the output shaft.

(3) Relatively high efficiency for the torque convertor over a very wide range of speeds. This feature permits the overall efficiency of the transmission to be high. It is especially important in the low speed range of the transmission where the greater part of the input power is transferred through the hydraulic torque convertor.

The invention may be embodied in other specific forms without departing from the spirit or essential characteristics thereof. The present embodiments are therefore to be considered in all respects as illustrative and not restrictive, the scope of the invention being indicated by the appended claims rather than by foregoing description, and all changes which come within the meaning and range of equivalency of the claims are therefore intended to be embraced therein.

What is claimed and desired to be secured by United States Letters Patent is:

1. In a power transmission, a differential gear mechanism having an input, a first output drivingly connected to said input by a ratio change gear train and a second output drivingly ocnnected to said input by a second ratio change gear train; a transmission output connected to said differential mechanism first output; a torque converter comprising means defining a continuous fluid circuit, a radial flow centrifugal pump in said circuit connected to said differential mechanism second output for rotation in a first direction; a reaction type turbine in said circuit and having its outlet adjacent the inlet of said pump and its blades directed to discharge fluid in the direction of rotation of said pump at least when said turbine is transmitting a torque substantially above zero and a circumferential flow retarding stator interposed in said circuit between the pump outlet and the turbine inlet, said reaction type turbine comprising a plurality of turbine blades adjacently arranged and delimiting flow passages with each of said flow passages having an inlet and an outlet and providing a flow section transversely of the direction of fluid flow which is narrower at said outlet than at said inlet, the blades of said turbine being so arranged with respect to the direction of fluid flow to enable the flow of fluid to effectuate rotation of said turbine in a direction opposite to that of said pump; and a torque multiplying gear train drive connecting said turbine and said first output; whereby the torque transmitted to said first output through said first ratio change gear train is augmented by the torque transmitted in series thereto through said second ratio change gear train, said torque converter and said torque multiplying gear train.

2. The combination defined in claim 1 wherein said reaction turbine is an axial flow turbine.

3. In a transmission as claimed in claim 1, air being used as energy transferring means in said torque converter, and means for continuously renewing the air in said torque converter.

4. In a transmission as claimed in claim 3, the air circuit in said torque converter having points of relatively high pressure and points of relatively low pressure, means defining a first air chamber connected by first bores with said points of relatively high pressure, means for guiding air from said first chamber to the outside, means defining a second chamber, means for sucking air from said points of relatively low pressure into said second chamber, and second bores connecting said second chamber with the outside.

5. In a transmission as claimed in claim 4, said second openings being arranged within said circuit at places liable to a reflux of air so as to produce by said air being sucked off an effect exhausting the boundary layers of said air.

6. The transmission defined in claim 1 wherein said differential gear mechanism is an epicyclic gear train.

7. The transmission defined in claim 1 wherein said differential gear mechanism comprises a sun gear connected to said input, a planetary carrier coaxially rotatable relative to said sun gear and connected to said transmission output shaft, a plurality of planetary pinions, journalled on said carrier in constant mesh with said sun gear, and a rotatable ring gear in constant mesh with said pinions and drive connected to said pump.

8. The transmission defined in claim 1 wherein the blades of said turbine are arranged within the portion of said fluid circuit having the smallest diameter relative to said turbine rotation axis.

9. The transmission defined in claim 1 wherein said turbine is a radial flow turbine.

10. The transmission defined in claim 1 wherein said stator comprises first and second portions at least one of which is permanently fixed in operative position within said circuit.

11. The transmission defined in claim 10 wherein the upstream portion of said stator adjacent the outlet of the pump in said circuit is the permanently fixed portion and wherein the downstream portion of said stator is movable, and wherein said converter embodies means for so controlling said stator movable portion that said movable stator portion is rendered ineffective upon the fluid in said circuit throughout a portion of the operating range of said converter and is fixed in operative relation on said circuit throughout the remainder of the converter operating range.

12. The transmission defined in claim 11 wherein said movable stator portion is mounted for rotation in said circuit and said controlling means comprises a selectively actuate brake for arresting its rotation.

13. The transmission defined in claim 11 wherein said movable stator portion is radially bladed and is mounted for axial movement between an operative position in said circuit and an axially spaced inoperative position adjacent said circuit in which the fluid in said circuit bypasses said movable stator portion.

14. The transmission defined in claim 11 wherein said controlling means comprises a differential pressure responsive device connected for response to the differential pressure across said pump, means controlled by said differential pressure responsive device for maintaining said movable stator portion ineffective so long as the differential pressure across said pump is in excess of a predetermined magnitude and for automatically rendering said movable stator portion effective so long as the differential pressure across said pump is equal to or less than said predetermined magnitude.

15. The transmission defined in claim 1 including a brake operative when actuated to prevent movement of said pump, and means for automatically actuating said brake at a point in the operating range of said transmission whereby, beyond said point, power imparted to said differential gear mechanism input is transmitted to said transmission output solely by said differential gear mechanism first output and said torque converter is rendered inoperative.

16. A torque converter consisting of means defining a continuous fluid circuit, a radial flow centrifugal pump in said circuit mounted for rotation in a first direction; a reaction type turbine in said circuit and having its outlet adjacent the inlet of said pump and its blades directed to discharge fluid in the direction of rotation of said pump at least when said turbine is transmitting a torque substantially above zero and a circumferential flow retarding stator interposed in said circuit between the pump outlet and the turbine inlet, said reaction type turbine comprising a plurality of turbine blades adjacently arranged and delimiting flow passages with each of said flow passages having an inlet and an outlet and providing a flow section transversely of the direction of fluid flow which is narrower at said inlet than at said outlet, the blades of said turbine being so arranged with respect to the direction of fluid flow to enable the flow of fluid to effectuate rotation of said turbine in a direction opposite to that of said pump.

17. The torque converter defined in claim 16 wherein said turbine is an axial flow turbine.

18. The torque converter defined in claim 16 wherein said turbine is a radial flow turbine.

19. The torque converter defined in claim 16 wherein said stator comprises first and second portions at least one of which is permanently fixed in operative position within said circuit.

20. The torque converter defined in claim 19 wherein the upstream portion of said stator adjacent the outlet of the pump in said circuit is the permanently fixed portion and wherein the downstream portion of said stator is movable, and wherein said converter embodies means for so controlling said stator movable portion that said movable stator portion is rendered ineffective upon the fluid in said circuit throughout a portion of the operating range of said converter and is fixed in operative relation in said circuit throughout the remainder of the converter operating range.

21. The torque converter defined in claim 20 wherein said movable stator portion is mounted for rotation in said circuit and said controlling means comprises a selectively actuate brake for arresting its rotation.

22. The torque converter defined in claim 20 wherein said movable stator portion is radially bladed and is mounted for axial movement between an operative position in said circuit and an axially spaced inoperative position adjacent said circuit in which the fluid in said circuit bypasses said movable stator portion.

23. The torque converter defined in claim 20 wherein said controlling means comprises a differential pressure responsive device connected for response to the differential pressure across said pump, means controlled by said differential pressure responsive device for maintaining said movable stator portion ineffective so long as the differential pressure across said pump is in excess of a predetermined magnitude and for automatically rendering said movable stator portion effective so long as the differential pressure across said pump is equal to or less than said predetermined magnitude.

24. The torque converter defined in claim 16 including a brake mounted on said circuit defining means adjacent said pump and operative when actuated to arrest movement of said pump.

25. In combination in a hydraulic torque converter: an impeller, a radially bladed reaction type turbine wheel, and a stationary reaction member forming with said impeller and said turbine a fluid circuit, said turbine wheel comprising a reaction type blading having a plurality of turbine blades adjacently arranged and delimiting flow passages with each of said flow passages having an inlet and an outlet and providing a flow section transversely of the direction of fluid flow which is narrower at said outlet than at said inlet, the blades of said turbine wheel being so curved relative to the direction of fluid velocity entering said passages as to enable the fluid in said circuit to drive said turbine wheel in a direction opposite to the direction of rotation of said impeller and being arranged within said impeller to be passed through by the fluid of said circuit from the inside toward the outside of said torque converter in a radial direction to thereby impart the energy produced by said impeller to the fluid in said circuit in the form of circumferential velocity and in the direction of rotation of said impeller.

26. In combination in a hydraulic torque converter: an impeller, each of the blades of said impeller having a curved surface of median camber which is convex in the direction of rotation of said impeller, a radial flow reaction type turbine wheel, and a stationary reaction member forming a fluid circuit with said impeller and said turbine wheel, said turbine wheel comprising a reaction type blading having a plurality of turbine blades adjacently arranged and delimiting flow passages with each of said flow passages having an inlet and an outlet and providing a flow section transversely of the direction of fluid flow which is narrower at said outlet than at said inlet, each of the blades of said turbine having a curved surface of median camber which is convex in the direction of rotation of said turbine wheel for driving said turbine wheel by fluid in said circuit in a direction opposite to the direction of rotation of said impeller, the inner diameter of said impeller being greater than the outer diameter of said turbine wheel, the arrangement being such that fluid in said fluid circuit passes through said turbine from the inside toward the outside thereof in radial direction.

27. In combination in a hydraulic torque converter: an impeller, each of the blades of said impeller having a curved surface of median camber which is convex in the direction of rotation of said impeller, a radial flow reaction type turbine wheel, a first reaction member being arranged stationarily and forming a fluid circuit with said impeller and said turbine wheel, said turbine wheel, comprising a reaction type blading having a plurality of turbine blades adjacently arranged and delimiting flow passages with each of said flow passages having an inlet and an outlet and providing a flow section transversely of the direction of fluid flow which is narrower at said outlet than at said inlet, each of the blades of said turbine having a curved surface of median camber which is convex in the direction of turbine wheel rotation for driving said turbine wheel by fluid in said circuit in a direction opposite to the direction of rotation of said impeller, the inner diameter of said impeller being greater than the outer diameter of said turbine wheel, the fluid of said fluid circuit passing through said turbine wheel from the inside toward the outside thereof in a radial direction, a second reaction member in said fluid circuit, and fluid pressure responsive means operable in response to certain pressures in said fluid circuit respectively to make said second reaction member effective or ineffective.

28. In combination in a hydraulic torque converter: an impeller, each of the blades of said impeller having a curved surface of median camber which is convex in the direction of rotation of said impeller, a radial flow reaction type turbine wheel, a first reaction member being arranged stationarily and forming a fluid circuit with said impeller and said turbine wheel, said turbine wheel comprising a reaction type blading having a plurality of turbine blades adjacently arranged and delimiting flow passages with each of said flow passages having an inlet and an outlet and providing a flow section transversely of the direction of fluid flow which is narrower at said inlet than at said outlet, each of the blades of said turbine wheel having a curved surface of median camber which is convex in the direction of rotation of said turbine wheel for driving said turbine wheel by fluid in said circuit in a direction opposite to the direction of rotation of said impeller, the inner diameter of said impeller being greater than the outer diameter of said turbine wheel, the fluid of said fluid circuit passing through said turbine wheel from the inside toward the outside thereof in a radial direction, a second reaction member having its blades passed through by fluid in said circuit in substantially axial direction, fluid pressure responsive clamping means, and fluid operable piston means arranged for fluid communication with said fluid circuit and operable in response to a certain fluid pressure in said circuit to actuate said clamping means for locking said second reaction member.

29. In combination in a hydraulic torque converter: an impeller, each of the blades of said impeller having a curved surface of median camber which is convex in the direction of rotation of said impeller, a radial flow reaction type turbine wheel, a first reaction member being arranged stationarily and forming a fluid circuit with said impeller and said turbine wheel, said turbine wheel comprising a reaction type blading having a plurality of turbine blades adjacently arranged and delimiting flow passages with each of said flow passages having an inlet and an outlet and providing a flow section transversely of the direction of the fluid flow which is narrower at said inlet than at said outlet with each of the blades of said turbine wheel having a curved surface of median camber which is convex in the direction of rotation of said turbine wheel for driving said turbine wheel by fluid in said circuit in a direction opposite to the direction of rotation of said impeller, the inner diameter of said impeller being greater than the outer diameter of said turbine wheel, the fluid of said fluid circuit passing through said turbine wheel from the inside toward the outside thereof in a radial direction, a second and radial flow reaction member, and control means operable in response to a certain fluid pressure in said fluid circuit to move said second reaction member axially selectively into and out of its operative position.

30. A hydraulic torque converter according to claim 29, in which said control means consists of annular fluid pressure responsive piston means.

31. A hydraulic torque converter according to claim 29, in which said control means for said second reaction member is arranged within the guiding path of said torque converter.

32. The torque converter defined in claim 16 wherein the blades of said turbine are disposed in the smallest diametral section of said circuit.

References Cited in the file of this patent
UNITED STATES PATENTS

| | | |
|---|---|---|
| 1,760,480 | Coats | May 27, 1930 |
| 2,116,461 | Fottinger | May 3, 1938 |
| 2,158,557 | Van Lammeren | May 16, 1939 |
| 2,251,972 | Banner | Aug. 12, 1941 |
| 2,303,829 | Dodge | Dec. 1, 1942 |
| 2,578,450 | Pollard | Dec. 11, 1951 |
| 2,687,657 | Kugel et al. | Aug. 31, 1954 |
| 2,695,533 | Pollard | Nov. 30, 1954 |

UNITED STATES PATENT OFFICE
CERTIFICATE OF CORRECTION

Patent No. 3,078,739                                    February 26, 1963

Hellmut Weinrich

It is hereby certified that error appears in the above numbered patent requiring correction and that the said Letters Patent should read as corrected below.

In the drawings, Sheet 11, Fig. 28, for the reference numeral "824" designating the passage leading to chamber 825 read -- 824' --; column 4, line 26, for "turbine" read -- turbine --; line 32, for "merid an" read -- meridian --; column 10, line 71, after "increase" insert -- in --; column 12, line 2, for "cordinates" read -- coordinates --; column 15, line 31, for "un" read -- sun --; line 41, for "20" read -- 420 --; column 16, line 66, for "4.19" read -- 4.18 --; column 17, line 13, for "We" read -- I --; column 19, line 70, strike out "is", second occurrence; column 21, line 51, after "dropped" insert -- to --; column 22, line 23, before "there" insert -- since --; column 29, line 58, for "retractible" read -- retractable --; column 30, line 19, for "842" read -- 824 --; line 24, for "842 and 824" read -- 824 and 824' --; line 37, for "842" read -- 824 --; line 38, for "824" read 824' --.

Signed and sealed this 25th day of February 1964.

(SEAL)
Attest:

ERNEST W. SWIDER                              EDWIN L. REYNOLDS
Attesting Officer                        Acting Commissioner of Patents